United States Patent
Kondapuram et al.

(10) Patent No.: US 12,288,095 B2
(45) Date of Patent: Apr. 29, 2025

(54) METHODS, SYSTEMS, APPARATUS, AND ARTICLES OF MANUFACTURE TO EXTEND THE LIFE OF EMBEDDED PROCESSORS

(71) Applicant: Intel Corporation, Santa Clara, CA (US)

(72) Inventors: Ganesh Kondapuram, Chandler, AZ (US); Chetan Rawal, Chandler, AZ (US); Vikram Dadwal, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 17/132,508

(22) Filed: Dec. 23, 2020

(65) Prior Publication Data

US 2021/0149736 A1 May 20, 2021

(51) Int. Cl.
*G06F 9/46* (2006.01)
*G06F 9/48* (2006.01)
(Continued)

(52) U.S. Cl.
CPC .......... *G06F 9/5027* (2013.01); *G06F 9/4893* (2013.01); *G06F 9/5061* (2013.01);
(Continued)

(58) Field of Classification Search
None
See application file for complete search history.

(56) References Cited

U.S. PATENT DOCUMENTS 6,775,624 B2 * 8/2004 Storino ................. G06Q 30/02
702/34
9,424,092 B2 * 8/2016 Singh .................... G06F 9/5094
(Continued)

FOREIGN PATENT DOCUMENTS

WO   WO-2013126066 A1 *  8/2013  ............ G06F 11/008

OTHER PUBLICATIONS

Anandtech; Why Intel Processors Draw More Power Than Expected: TDP and Turbo Explained; www.anandtech.com/show/13544/why-intel-processors-draw-more-power-than-expected-tdp\turbo; Nov. 9, 2018 (Year: 2018).*

(Continued)

*Primary Examiner* — Bing Zhao
(74) *Attorney, Agent, or Firm* — Hanley, Flight & Zimmerman, LLC

(57) ABSTRACT

Methods, systems, apparatus, and articles of manufacture to extend the life of embedded processors are disclosed herein. Disclosed example apparatus include a policy selector to select a policy, based on input information. The apparatus extends an operating lifespan of a microprocessor having a plurality of cores. The apparatus also includes a cores partitioner to divide, based on the selected policy, the plurality of cores into subsets of cores, including a first subset and a second subset. A sensor monitors, based on the selected policy, at least one operational parameter of the cores, and a cores switcher switches a first core of the first subset of cores from active to inactive and to switch a second core of the second subset of cores from inactive to active based on the at least one operational parameter. The switches reduce an amount of degradation experienced by the first core and the second core.

19 Claims, 12 Drawing Sheets

(51) Int. Cl.
    *G06F 9/50*         (2006.01)
    *G06F 11/30*      (2006.01)

(52) U.S. Cl.
    CPC ........ *G06F 9/5094* (2013.01); *G06F 11/3024* (2013.01); *G06F 11/3058* (2013.01)

(56) References Cited

U.S. PATENT DOCUMENTS

| | | |
|---|---|---|
| 2008/0028244 A1 | 1/2008 | Capps et al. |
| 2014/0359350 A1 | 12/2014 | Plank et al. |
| 2015/0169363 A1* | 6/2015 | Anderson ............. G06F 9/4893 718/103 |
| 2019/0042330 A1* | 2/2019 | Duarte Cardoso ..... G06F 1/206 |

OTHER PUBLICATIONS

Shin et al; Thermal-Aware Scheduling of Critical Applications Using Job Migration and Power-Gating on Multi-Core Chips; IEEE 2011 (Year: 2011).*

Ma, K. et al. "PGCapping: Exploiting Power Gating for Power Capping and Core Lifetime Balancing in CMPs", 2012 21st International Conference on Parallel Architectures and Compilation Techniques (PACT), ACM, Sep. 19, 2012, pp. 13-22.

European Patent Office, "Extended European Search Report," mailed in connection with European Patent Application No. 21197172.6 on Mar. 17, 2022, 9 pages.

* cited by examiner

METHODS, SYSTEMS, APPARATUS, AND ARTICLES OF MANUFACTURE TO EXTEND THE LIFE OF EMBEDDED PROCESSORS

FIELD OF THE DISCLOSURE

This disclosure relates generally to embedded processors, and, more particularly, to extending the life of embedded processors.

BACKGROUND

Modern microprocessors contain billions of transistors that sometimes operate in excess of three billion cycles per second. Microprocessor applications range from electronic devices used in the home to electronic equipment used in industrial/manufacturing applications. The home based applications and manufacturing based applications often differ, both in the usage of the devices and in the environments in which the devices are deployed.

Figure 1:
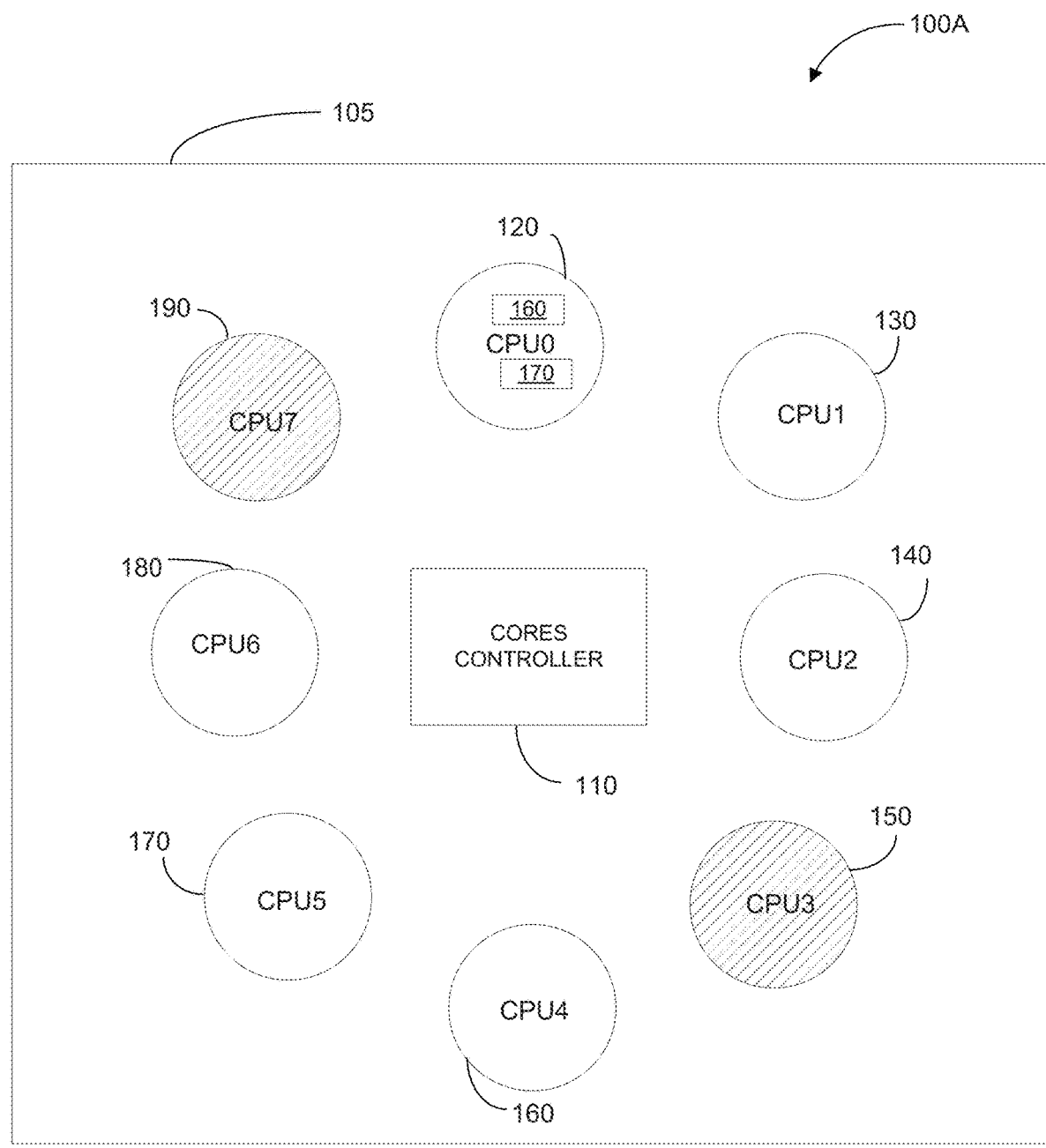
FIG. 1 block diagram of a first printed circuit board on which a first cores controller and eight core are disposed.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Embedded processors used in many applications require useful lifetime of 10 to 15 years of continuous operation. These devices when used in harsh environmental condition are expected to operate reliably during that lifetime. Modern microprocessors contain billions of transistors, sometimes operating at clock speeds in excess of 3 billion cycles per second. Such high clock speed in highly dense, with small geometries mean that the transistors generate lot of heat, which accelerates their decline.

Another concern is the difference between supply voltage and the threshold at which the transistors turn on getting smaller. Also, various improvements in the way silicon logic is fabricated have introduced new concerns about degradation. And transistors scaled down to today's small dimensions will be impacted more than ever by variations in their operating conditions, which, in turn, leads to great differences from one transistor to another in how fast they wear out. Thus, achieving long life as required for industrial applications is increasingly challenging with the increasing complexity of microprocessors.

Currently long life is achieved through appropriate changes in process or physical design methodology. In order to get advantage of economies of scale, complex semiconductor devices are designed so that they can be used in multiple markets. Due to slight variations in the process technology, a percentage of the manufactured devices are screened with certain electrical characteristics, making them suitable for industrial applications. With proper selection criteria, these parts can be screened and tested for higher reliability that industrial applications demand.

As semiconductor processing technology advances to smaller geometries, the number of parts that can be screened for industrial applications becomes smaller and smaller as semiconductor process advances with time. Therefore, semiconductor parts to be used in industrial applications will be required to be custom built with larger geometries which will be cost prohibitive.

Further, industrial applications require parts that reliably operate for extended lifetimes (10-15 years). Client products only offer 3-5 years of product life. Currently, industry invests in Quality & Reliability (Q&R) and High-Volume Manufacturing (HVM) testers by binning the parts for extended life. As technology advances to smaller processor nodes, it will be challenging to qualify products for extended life due to smaller geometry and narrow margins.

Additionally, CPUs built using CMOS process technology are prone to several degradation mechanisms like hot-carrier injection, bias temperature instability, gate oxide breakdown and electromigration. These degradation mechanisms are a function of environment (temperature, voltage), frequency and the workload stress.

The methods, systems, apparatus, and articles of manufacture disclosed herein prolong/extend the life of multi-core processors by keeping only a subset of the total number of cores active at a time and switching between active and non-active cores based on one or more reservation policies.

Such reservation policies include the provisioning of at least some of the CPU cores as reserve cores. At any time, only a subset of the total number of cores are active (NCActive) with the remaining cores inactive and disabled (NCReserve). In some examples, the number of inactive cores can be programmable and can be based on product application. The total number of cores in a product is represented using "NCActive+ NCReserve." For example, an eight core product can have six NCActive cores and two NCReserve cores such that the total number of cores is 8.

In some examples, the policies are based on an amount of time a subset of cores are active (also referred to as "time-based reservation policies" (TBRP)). In some examples, the policies are based on an amount of degradation experienced by one or more of the cores or subsets of the cores (also referred to as "quality degradation monitoring reservation policies" (QDMRP)). In some examples, the quality degradation monitoring takes degradation mechanisms such as temperature, voltage, frequency and the workload stress of the cores or subset of cores into consideration when determining the amount of degradation.

In some examples, the environmental characteristics and durations of operation of the cores are monitored and the monitoring data is logged in a time series for storage in a non-volatile memory (e.g., NVRAM/NVMe). In some such examples, the logged time-series data is used to determine whether a switch of cores (e.g., to activate reserved cores and to deactivate active cores) is to occur.

FIG. 1 block diagram of a first printed circuit board 105 on which a first cores controller 110 and eight cores (e.g., CPU0 120, CPU1 130, CPU2 140, CPU3 150, CPU4 160, CPU5 170, CPU6 180, CPU7 190) are disposed. In the block diagram, the first cores controller 110 causes the cores CPU7 190 and CPU3 150 to be inactive/reserved and causes the remaining cores to be active. In some examples, though illustrated, for clarity, only with respect to the CPU0 120 of FIG. 1, each of the cores disclosed herein includes (or is otherwise associated with) a digital thermal sensor 160 and core usage sensor 170. In some examples, the cores described herein are embedded processors. In some examples, based on a policy that involves monitoring of any of a number of factors including time, workload, temperature, etc., the first cores controller 110 performs a cores switch by which the inactive cores CPU7 190 and CPU3, 150 are activated and a different two of the remaining cores (e.g., CPU0 120, CPU1 130, CPU2 140, CPU4 160, CPU5 170, CPU6 180) are deactivated. In some examples, in addition to activating and deactivating cores, operations being performed at most recently deactivated cores are transferred to currently active cores. Controlling the cores in this manner reduces the amount of operating time and/or degradation to which each core is subject. In some examples, reducing the amount of operating time and/or degradation of the cores results in a longer lifespan for a product containing the cores (CPU0 120, CPU1 130, CPU2 140, CPU3 150, CPU4 160, CPU5 170, CPU6 180, CPU7 190).

Figure 2:
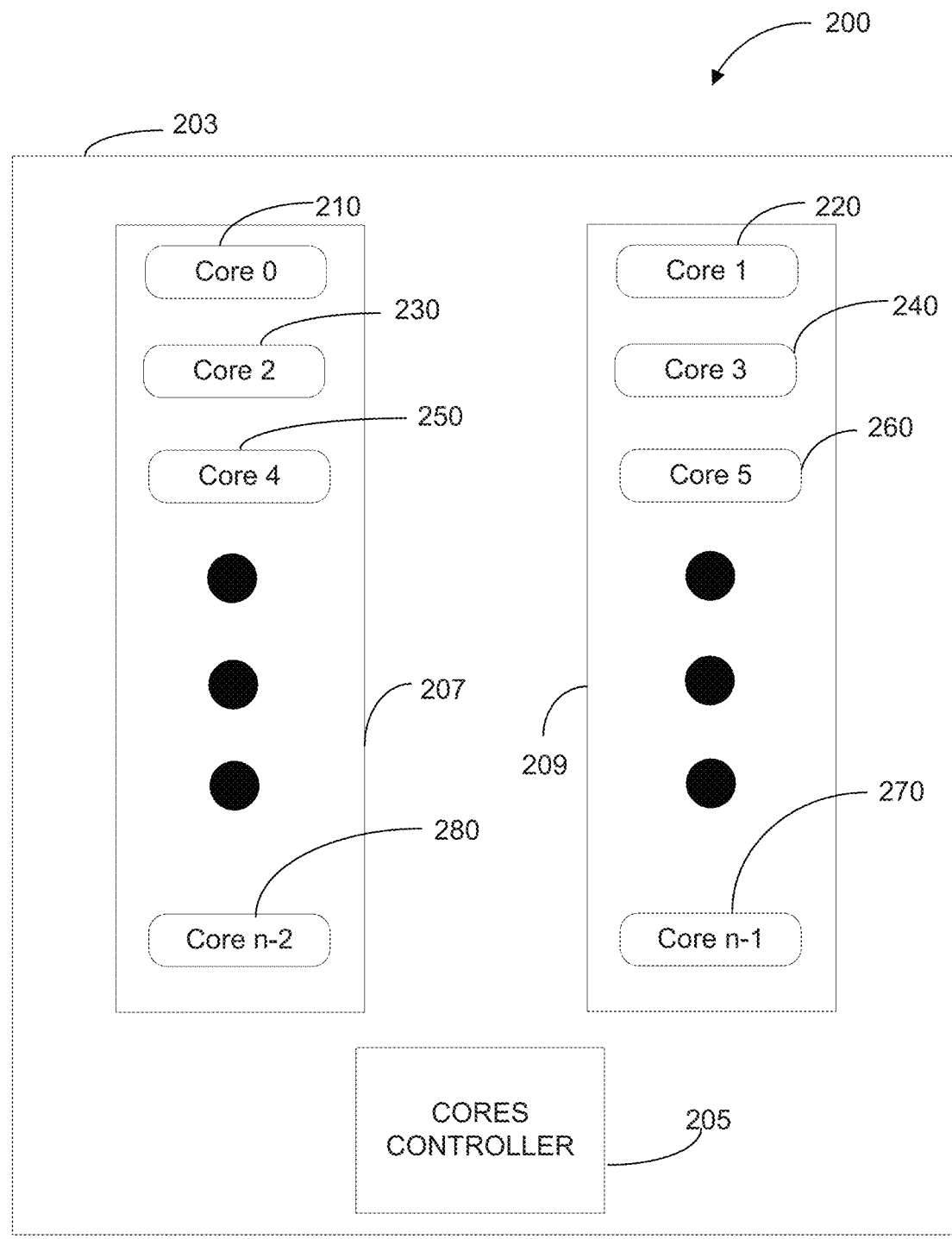
FIG. 2 is a block diagram of a second printed circuit board on which a second cores controller and a number (n) of cores are disposed.

FIG. 2 is a block diagram 200 of a second printed circuit board 203 on which a second cores controller 205 and two groups/partitions of cores include a first partition of cores 207 and a second partition of cores 209. In some examples, the total number of cores is denoted as "n". In some such examples, the first partition of cores 207 includes Core 0 210, Core 2 230, Core 4 250, Core n-2 280 and any cores assigned even numbers between 4 and n-2. In some such examples, the second partition of cores 209 includes Core 1 220, Core 3 240, Core 5 260, Core n-1 270, and any cores assigned odd numbers between 5 and n-1.

In some examples, the second cores controller 205 partitions the n-1 cores into the first partition of cores 207 and the second partition of cores 209. In some examples, the second cores controller 205 causes the cores included in the first partition of cores 207 to be active when the cores of the second partition of cores 209 are inactive. In addition, at a determined time based on one or more factors, the second cores controller 205 causes the cores of the first partition of cores 207 to become inactive and the cores of the second partition of cores 209 to become active.

Figure 3:
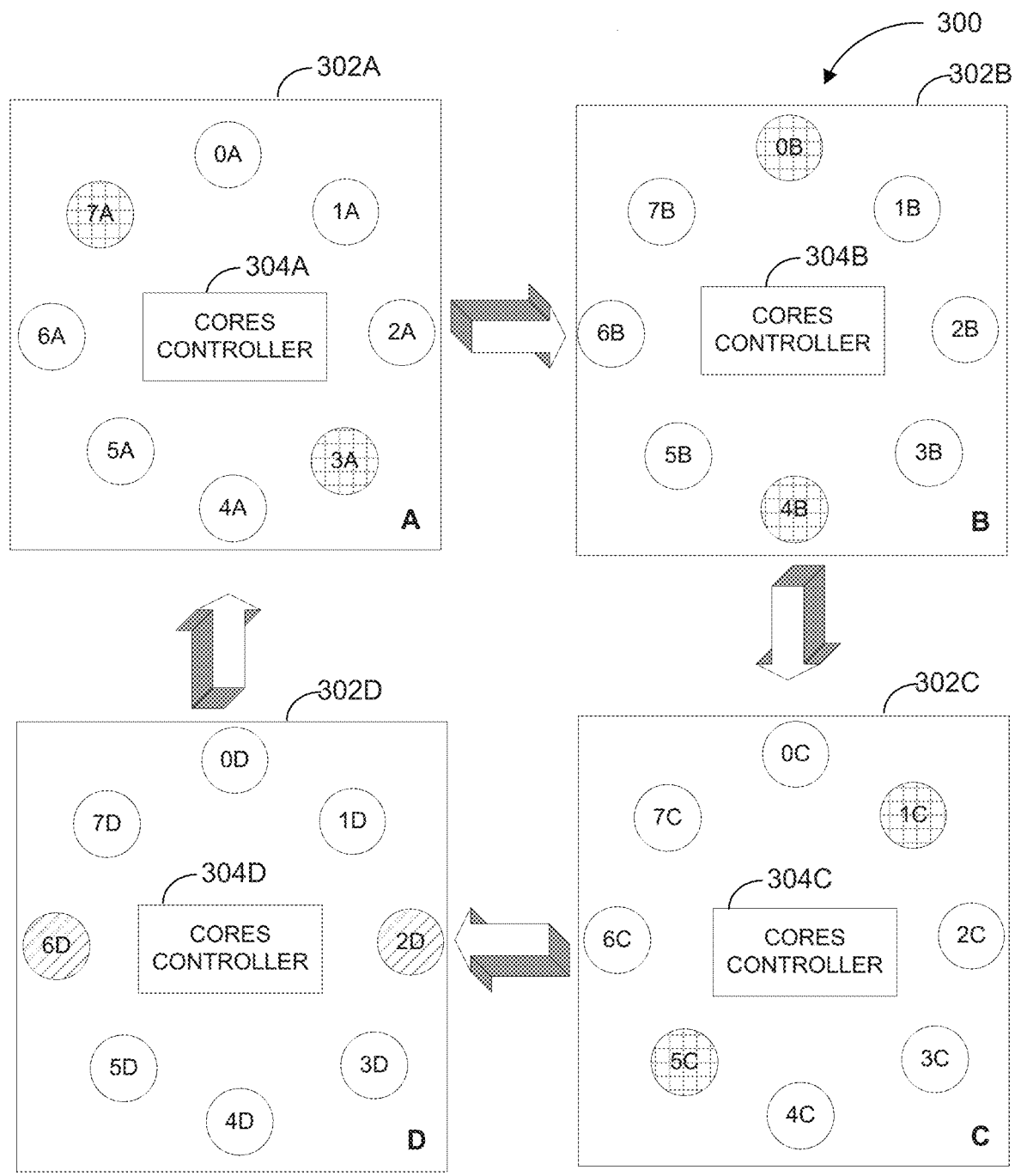
FIG. 3 is a block diagram of a third printed circuit board on which eight cores are disposed and in which the third printed circuit board is represented in four different active cores configurations.

FIG. 3 is a block diagram 300 of four configurations (e.g., A, B, C and D) of a third printed circuit board 302 having eight cores (e.g., Core 0, Core 1, Core 2, Core 3, Core 4, Core 5, Core 6, Core 7). In the example of FIG. 3, the numbers used to identify the cores (0-7) are followed by an A, B, C, or D, depending on whether the cores are on the first configuration A, the second configuration B, the third configuration C, and the fourth activation D, respectively. Additionally, the printed circuit board 302A, 302B, 302C, 302D includes a third cores controller 304A, 304B, 304C, 304D.

In some examples, the third cores controller 304A, 304B, 304C, 304D partitions the 8 cores into four groups. In some examples, the first group includes the Core 3A and the Core 7A. In some examples, the second group includes the Core 0B and the Core 4B, the third group includes the Core 1C, and the Core 5C, and the fourth group includes the Core 2D and the Core 6D. In some examples, the third cores controller 304A, 304B, 304C, 304D causes the cores included in the first group to be inactive and the cores in the second, third and fourth groups to be active. In some examples, at a determined time and/or based on one or more factors, the third cores controller 304A, 304B, 304C, 304D causes the cores of the second group to be deactivated and causes the cores of the first group to be activated such that the first, third and fourth groups active. In some examples, the third cores controller 304A, 304B, 304C, 304D causes the cores of the third group to become inactive and causes the cores of the second group to be active such that the first, second, and fourth groups of cores are active. In some examples, the third cores controller 304A, 304B, 304C, 304D causes the cores of the fourth group to become inactive and causes the cores of the third group to be activated such that the cores of the first, second, and third groups are active. The third cores controller 304A, 304B, 304C, 304D switches the active/inactive status of the groups of cores in a manner that extends the life of the product in which the third cores controller 302A, 302B, 302C, 302D is installed.

Figure 4:
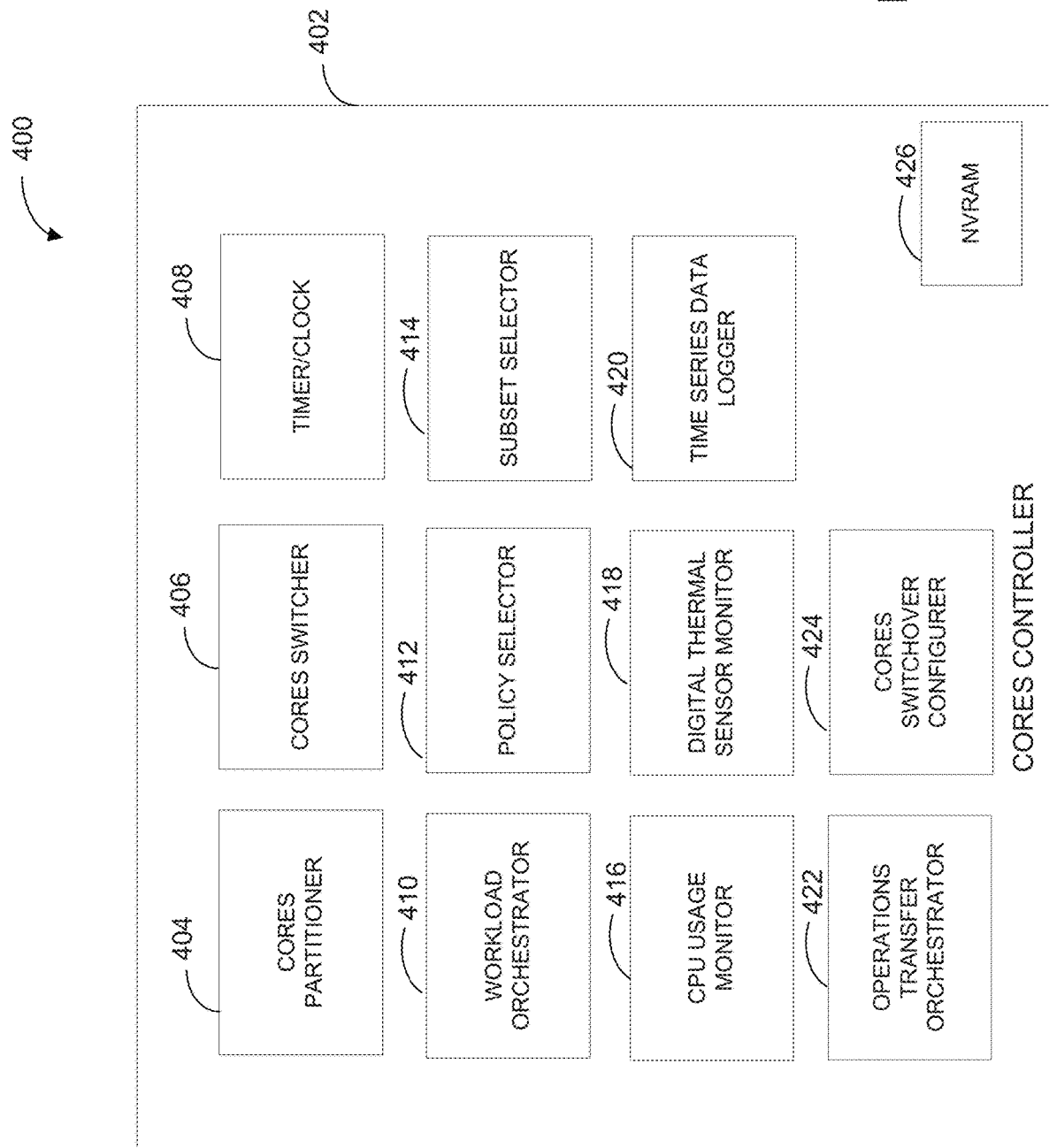
FIG. 4 is a block diagram of the first, second and/or third cores controller of any of FIGS. 1-3.

FIG. 4 is a block diagram of an example cores controller 402 that represents the first, second and/or third cores controller of any of FIGS. 1-3. In some examples, the cores controller 402 includes an example cores partitioner 404, an example cores switcher 406, an example timer/clock 408, an example workload orchestrator 410, an example policy selector 412, an example subset selector 414, an example CPU usage monitor 416, an example digital thermal sensor 418, an example time series data logger 420, an example operations transfer orchestrator 422, an example cores switchover configurer 424, and an example non-volatile random access memory (NVRAM) 426.

In some examples, the example cores controller 402 operates to switch cores (e.g., of a printed circuit board of a microprocessor) between active and inactive/reserved states. In some examples, the cores controller 402 causes the operations and/or workloads performed at a first (active) core to be transferred to a second (inactive) core at, before, or during the switching of the states of the first core to inactive and the second core to active. In some examples, the cores controller 402 achieves the switching of the cores in a manner such that operations being performed by the cores at the time of a switch are not interrupted or lost.

In some examples, the example cores partitioner 404 of the example cores controller 402 determines a number of cores to be controlled by the core controller 402 and also operates to partitioner the number of cores into groups/subsets. The number of groups/subsets can vary based on the configuration of the cores and/or the electronic device in which the cores are disposed, a manner in which monitoring data is collected, etc. In some examples, the determination as to the number of groups/subsets of cores to be created is informed, in part, by the example policy selector 412. The policy selector 412 selects a policy from among a variety of policies that will govern the manner in which the cores controller switches cores between active and inactive states. In some examples, a policy is based on a duration of time in which the cores are active. In some examples, a policy is based on degradation of the cores which can be caused by a temperature in which the cores are operating and/or an amount of usage (workload) the cores are experiencing. Accordingly, the policy selector is an example means for selecting a policy and the cores partitioner is a means to divide or partition cores into a subset of cores.

In some examples, based on, for example, the policy selected, the example subset selector 414 operates to select one or more groups/subsets of cores to be switched from a first state (e.g., inactive) to a second state (e.g., active) and vice versa. In some examples, the example cores switcher 406 switches the one or more groups/subset of cores based on information supplied by the example timer/clock 408, the example CPU usage monitor 416, the example digital thermal sensor monitor 418, the example time series data logger 420 and/or any of a variety of other monitored aspects/characteristics of the cores. In some examples, before the cores switcher 406 performs the switch operation (or any switching operation), the example cores switchover configurer 424 configures the cores in a manner that permits switchover to occur. Such configuring of the cores can include, for example, configuring the cores to be in communication (directly or indirectly) with one another, configuring the cores to receive and respond appropriately to activation signals and/or inactivation signals, configuring memories and/or other parts of the cores to have the same addresses, and/or any other of a variety of configuration operations that prepare the cores for switching between inactive and active states and vice versa. Accordingly, the cores switchover configurer is an example means to configure cores for a switch (also referred to as a core switchover) from an active to an inactive state and vice versa.

In some examples, the example cores switcher 406, before, during or after issuing a switch command (e.g., a command that will cause one or more of the subsets of cores to active/deactivate), notifies the example workload orchestrator 410. In some examples, the workload orchestrator 410 responds to the notification by determining CPU utilization of the workloads associated with each of the active cores that are to be deactivated and further determines a workload capacity of each of the inactive cores that are to be activated. In some such examples, the workload orchestrator 410 may operate to adjust the transfer of the workload between cores to ensure that the newly activated cores are able to handle the workload of the deactivated (or soon to be deactivated cores). In some examples, the workload orchestrator includes a comparator to compare workload capacities of the cores and the workload orchestrate notifies the cores switcher 406 when a cores switch will result in a newly activated core having insufficient capacity to handle a workload to be transferred by the workload orchestrator. In some such examples, the workload orchestrator, upon determining that the newly activated core will have sufficient capacity orchestrates the transfer of the workload between the cores. Accordingly, the workload orchestrator 410 is an example means for orchestrating a transfer of workload from one or more core to one or more other cores.

In some examples, the example cores switcher 406, before, during or after issuing a switch command (e.g., a command that will cause one or more of the subsets of cores to active/deactivate), notifies the example operations transfer orchestrator 422. In some examples, the operations transfer orchestrator 422 performs operations needed to ensure that operations of the cores being switched are successfully transferred without failing over, without damaging or affecting the operation of any processes that are executing at the time of switching, without resulting in dropped bits, etc. In some examples, the operations performed by the operations transfer orchestrator 422 can include identifying an order in which the operations are to be transferred, identifying different memory location into which different data is to be placed, etc. Accordingly, the operations transfer orchestrator 422 is a means for orchestrating a transfer of operations performed at a first core to a second core.

In some examples, as described above, the example cores switcher 406 determines when a switch is to occur based on a policy/scheme that uses an amount of time during which the cores are active (also referred to as a time based reservation policy). In some such examples, the cores switcher 406 uses information provided by the example timer/clock 408 to determine when a core switch is to occur. Accordingly, the cores switcher is an example means for switching cores.

In some examples, an example first time based reservation policy is employed, and the example cores partitioner 404 partitions the total number of cores into 2 groups as shown in FIG. 2. In this reservation policy/scheme, when an electronic device/product begins operating, one of the CPU groups (e.g., CPU Group1 207) is activated and then the second CPU group (CPU Group2 209) is activated after a fixed amount of product lifetime. When the cores of the Group2 209 are activated, the cores of the CPU Group1 207 are inactivated. In some such examples, the total number of cores in a product is twice the number of active cores. For example, an 8-core device/product that is designed for 5 years is expected to operate for 10 years. Thus, the number of active cores at any given time is 4. For the first 5 years, the cores of the CPU Group1 are active and the cores of the CPU Group2 are activated for the remaining 5 years (at which time the cores of the CPU Group1 are placed into inactive state). Accordingly, the overall lifetime of the product is 10 years, yet the 8 cores deployed in the product have lifespans of 5 years. In this manner, the lifespan of the product/device is extended from 5 years to 10 years through the usage of the cores controller 402 of FIG. 4 (also illustrated as the cores controller 205 in FIG. 2).

In some examples, an example second time based reservation policy/scheme is employed, and the example cores partitioner 404 partitions the total number of cores into 2 groups as shown in FIG. 2. In the second reservation policy/scheme, when an electronic device/product begins operating, one of the CPU groups (e.g., CPU Group1 207) is activated. Next, after a threshold amount of time has elapsed, the example cores switcher 406 switches the cores such that the cores of the CPU Group 1 207 are made inactive and the cores of the CPU Group2 are made active. The cores switcher 406 continue to switch the cores of CPU Group 1 and Group 2 between inactive and active states during an amount of time equal to 2 times the lifespan of the cores. In some examples, switching back and forth between CPU Group1 and CPU Group2 invokes the example workload orchestrator 410 and the example operations transfer orchestrator 422 at each switch. In some examples, switches occur after a fixed amount of product lifetime has elapsed until the entire product lifespan has been reached. In some examples, the cores of CPU Group1 are active for a total duration equal to one half the product lifespan and the cores of CPU Group2 are active for a total duration equal to one half the product lifespan.

In some examples, an example third time-based reservation policy/scheme is deployed wherein a small subset of the total number CPU cores is inactive or disabled at a time, as the workloads are moved cyclically to the active cores as shown in FIG. 3. In the example of FIG. 3, during a first cycle A, the core 3A and the core 7A are inactive and the remaining cores of cores A0-)7 are active. During a second cycle B, the core 0B and the core 4B are inactive and the remaining ones of cores 0-7 are active. During a third cycle C, the core 1C and the core 5C are inactive and the remaining ones of cores 0C-7C are active. During a fourth cycle D, the core 2D and the core 6D are inactive and the remaining ones of cores 0D-7D are active. In the third time based reservation policy/scheme a more effective and balanced utilization of the CPU cores 0-7 is achieved. In some such examples, the example workload orchestrator 410 and the example operations transfer orchestrator 422 operate to ensure smooth transitions during core switching as is described above. In some examples, switches occur cyclically after a fixed amount of product lifetime has elapsed until the target product lifespan has been reached. In some examples, such as those including two sets of cores, one set is active for one half the total product lifespan and the other set is activated for the remaining product lifespan. In some examples, an example quality degradation monitoring reservation policy (QDMRP) is used. A QDMRP accounts for silicon degradation as well as workload characteristics when determining that a switch is to occur. In some examples, CPU utilization monitoring is deployed, digital thermal sensor (DTS) monitoring is deployed and/or both CPU utilization and DTS monitoring are deployed. QDMRP policies account for the fact that modern day CPUs are built using CMOS process technology that is prone to several degradation mechanisms including hot-carrier injection, bias temperature instability, gate oxide breakdown, electromigration, etc. These degradation mechanisms are a function of environment (temperature, voltage), frequency and workload stress. QDMRP includes the usage of logging time series data for each CPU core in a non-volatile memory (NVRAM/NVMe) to track the effects of CPU utilization and temperature.

In a first example QDMRP policy, CPU core utilization is monitored as an indicator of an amount of stress to which the CPU cores are subjected. In the first example QDMRP policy, an interval of time (tracked by the example timer/clock 408) is used to determine a monitoring frequency that sets the periodicity at which the example CPU core utilization data will be stored as time series data by the example time-series data logger 420. In some examples, the CPU core utilization data is sensed by one or more CPU usage sensors and provided to the example CPU usage monitor 416. The time series data logger 420 stores the time series data in the example NVRAM 426. In addition, the example workload orchestrator 410 executes a round-robin load balancing algorithm to distribute workloads across the cores based on the CPU core utilization data. In some examples, the workloads are distributed with a goal of achieving an extended CPU core lifespan of twice the non-extended lifespan. TABLE 1 below presents example log data collected in connection with the example CPU core utilization based QDMRP policy.

TABLE 1

| Time | Core0 | Core1 | Core2 | Core3 | Core4 | Core5 | Core6 | Core7 |
|------|-------|-------|-------|-------|-------|-------|-------|-------|
| t1 | 80% | 50% | 15% | 3% | Inactive | 75% | 63% | Inactive |
| t2 | 50% | Inactive | 90% | 50% | 25% | Inactive | 33% | 38% |

TABLE 1-continued

| Time | Core0 | Core1 | Core2 | Core3 | Core4 | Core5 | Core6 | Core7 |
|---|---|---|---|---|---|---|---|---|
| t3 | Inactive | 3% | 79% | 100% | 75% | Inactive | 67% | 42% |
| ... | ... | ... | ... | ... | ... | ... | ... | ... |
| tn | 30% | 10% | Inactive | 27% | 45% | 16% | Inactive | 28% |

In a second example QDMRP policy, Digital Thermal Sensors data is used to prevent the operation of any single CPU core at a high temperature for an extended period of time. The second example QDMRP policy can be deployed in products operating in high temperature industrial environments using silicon that is only qualified for commercial temperatures. As the temperatures in industrial environments are high, degradation of silicon is accelerated. The DTS monitoring is to reduce the likelihood that any individual one of the CPU cores operates at high temperatures for extended periods of time. In some examples, this is achieved by offloading workloads between the CPU cores through the use of strategic, temperature-based switching, and keeping cores in inactive states intermittently.

In the example second QDMRP policy, time series data logging similar to that used with the first QDMRP policy is deployed except that instead of monitoring CPU usage, a junction temperature of each CPU core is measured. An example round-robin load balancing algorithm distributes workloads across the CPU cores based on DTS readings collected by the example digital thermal sensor monitor 418. As with the first QDMRP policy, an interval of time (tracked by the example timer/clock 408) is used to determine a monitoring frequency that sets the periodicity at which the example time series data logger 420 collects DTS monitoring data. The distribution of the workloads and intermittent core switching based on the DTS reading can ensure that the lifespan of the individual CPUs is extended to at least ten years (which exceeds a lifespan that would otherwise be achieved absent the application of the second QDMRP policy). TABLE 2 below presents example time-series log data collected in connection with the second (e.g., DTS monitoring based) QDMRP policy.

TABLE 2

| Time | Core0 | Core1 | Core2 | Core3 | Core4 | Core5 | Core6 | Core7 |
|---|---|---|---|---|---|---|---|---|
| t1 | 45° C. | 33° C. | 33° C. | 33° C. | Inactive | 40° C. | 33° C. | Inactive |
| t2 | 33° C. | Inactive | 65° C. | Inactive | 30° C. | 33° C. | 40° C. | 33° C. |
| t3 | Inactive | 31° C. | 33° C. | 33° C. | 30° C. | Inactive | 33° C. | 33° C. |
| ... | ... | ... | ... | ... | ... | ... | ... | ... |
| tn | 40° C. | 30° C. | Inactive | 27° C. | 30° C. | 29° C. | Inactive | 33° C. |

In an example third QDMRP, the example cores switcher 406 employs a switching scheme that accounts for both CPU core utilization and the DTS temperatures. In the third QDMRP, a round-robin load balancing algorithm strategically distributes workloads across the cores based on a combination of CPU core utilization monitoring data and DTS monitoring data to extend the lifetime of individual ones of the CPU cores to extend to at least ten years. As with the first and second QDMRP, an interval of time (tracked by the example timer/clock 408) is used to determine a monitoring frequency that sets the periodicity at which the example time series data logger 420 collects data. In the third QDMRP, the collected data includes DTS monitoring data (collected by the example DTS monitor 418) and CPU core usage monitoring data (collected by the example CPU usage monitor 416. The distribution of the workloads and intermittent core switching based on both the DTS monitoring data and the CPU core utilization data can ensure that the lifespan of the individual CPUs is extended to at least ten years (which exceeds a lifespan that would otherwise be achieved absent the application of the third QDMRP policy). TABLE 3 below presents example time series log data collected in connection with the third QDMRP policy.

TABLE 3

| Time | Core0 | Core1 | Core2 | Core3 | Core4 | Core5 | Core6 | Core7 |
|---|---|---|---|---|---|---|---|---|
| t1 | 80%, 33° C. | 50%, 33° C. | 15%, 30° C. | 3%, 40° C. | Inactive | 3%, 33° C. | 3%, 33° C. | Inactive |
| t2 | 50%, 40° C. | Inactive | 90%, 31° C. | Inactive | 3%, 33° C. | 3%, 33° C. | 3%, 33° C. | 3%, 33° C. |
| t3 | Inactive | 3%, 33° C. | 79%, 35° C. | 98%, 40° C. | 3%, 33° C. | Inactive | 3%, 33° C. | 3%, 33° C. |
| ... | ... | ... | ... | ... | ... | ... | ... | ... |
| tn | 30%, 33° C. | 10%, 33° C. | Inactive | 27%, 27° C. | 3%, 33° C. | 3%, 33° C. | Inactive | 3%, 33° C. |

While an example manner of implementing the cores controller 402 is illustrated in FIG. 4 (also shown as the first cores controller 110 of FIG. 1, the second cores controller 205 of FIG. 2, and the third cores controller 304B of FIG. 3), one or more of the elements, processes and/or devices illustrated in FIG. 4 may be combined, divided, re-arranged, omitted, eliminated and/or implemented in any other way. Further, the example cores partitioner 404, the example cores switcher 406, the example timer/clock 408, the example workload orchestrator 410, the example policy selector 412, the example subset selector 414, the example CPU usage monitor 416, the example digital thermal sensor 418, the example time series data logger 420, the example operations transfer orchestrator 422, the example cores switchover configurer 424, and the example non-volatile random access memory (NVRAM) 426 and/or, more generally, the example cores controller 402 of FIG. 4 may be implemented by hardware, software, firmware and/or any combination of hardware, software and/or firmware. Thus, for example, any of the example cores partitioner 404, the example cores switcher 406, the example timer/clock 408, the example workload orchestrator 410, the example policy selector 412, the example subset selector 414, the example CPU usage monitor 416, the example digital thermal sensor 418, the example time series data logger 420, the example operations transfer orchestrator 422, the example cores switchover configurer 424, and the example non-volatile random access memory (NVRAM) 426 and/or, more generally, the example cores controller 402 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example cores partitioner 404, the example cores switcher 406, the example timer/clock 408, the example workload orchestrator 410, the example policy selector 412, the example subset selector 414, the example CPU usage monitor 416, the example digital thermal sensor 418, the example time series data logger 420, the example operations transfer orchestrator 422, and/or the example cores switchover configurer 424 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cores controller 402 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the cores controller 402 is shown in FIG. 4. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5A, 5B, and 6, many other methods of implementing the example cores controller 402 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5A 5B, and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5A:
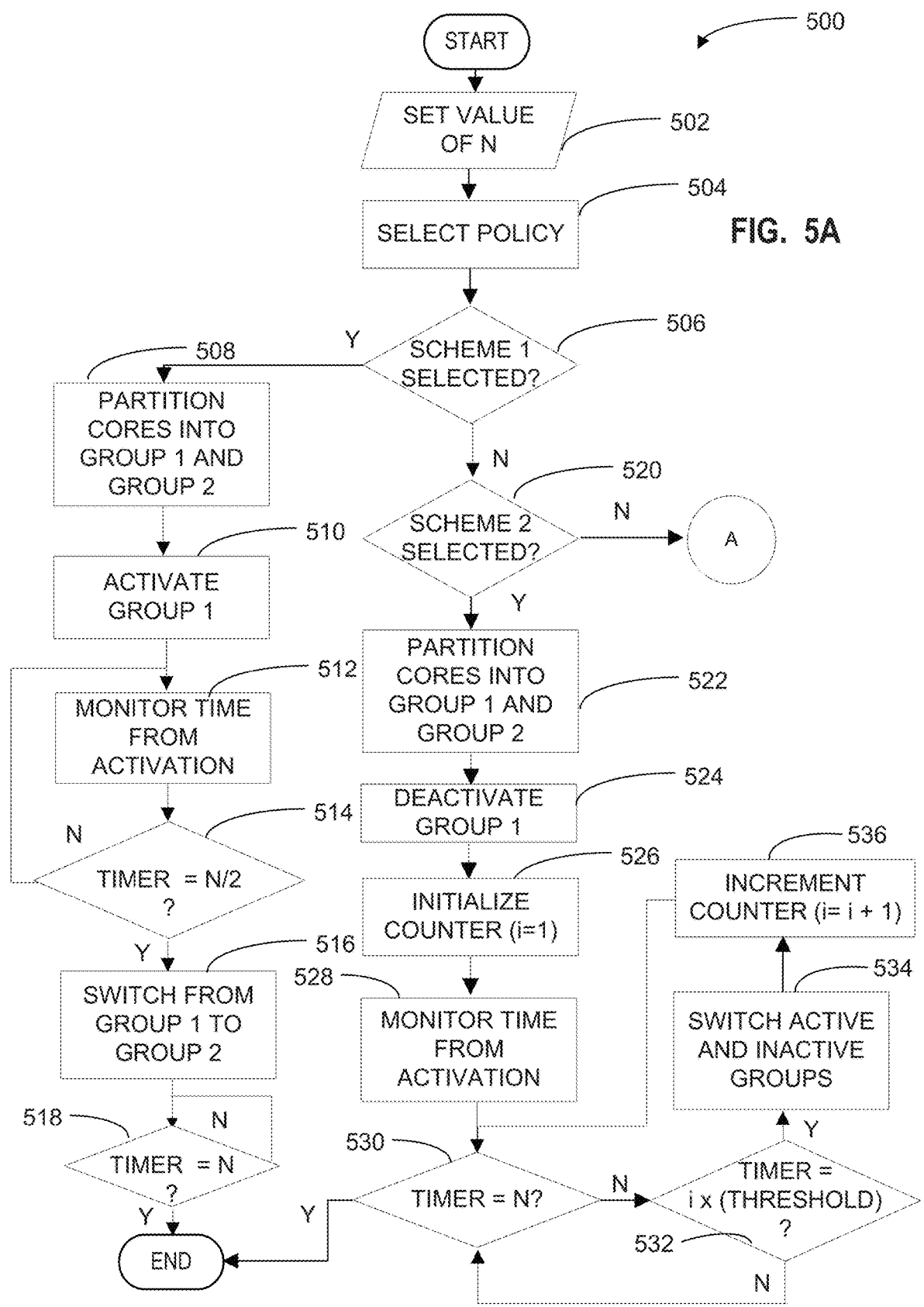
FIG. 5A and FIG. 5B collectively represent a flowchart representative of machine readable instructions which may be executed to implement any of the first, second and/or third cores controller of any of FIGS. 1-3.
Figure 5B:
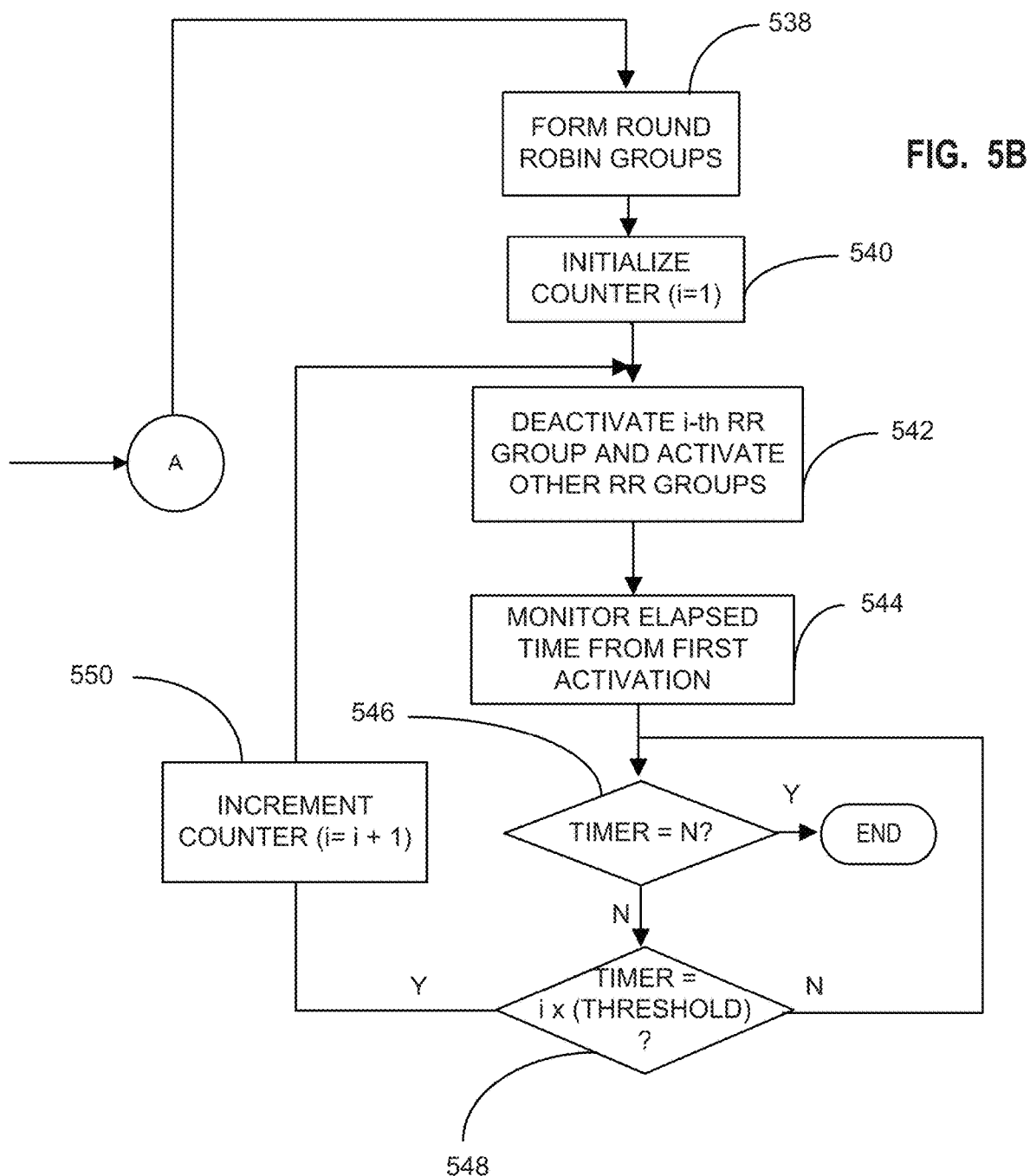

A program 500 of FIGS. 5A and 5B includes block 502 at which a value of N (representing a target lifespan of a product in which cores are disposed) is set for reference by the example timer/clock and/or the example cores switcher 406. In some examples, the value of N can be stored in the NVRAM of FIG. 426. In some examples, the value of N can be entered at an input device by a system administrator. In some examples, the value of N can be entered prior to sale of the product. A policy is selected at the example policy selector 412. (Block 504.) In some examples, the policy selector 412 can select from among a variety of policies based on, for example, a user preference, a type of product, an application to which the product will be put to use, an environment in which the product will be used, etc. The policy selector 412 determines whether a first scheme (Scheme 1) was selected (block 506) and, if so, the example cores partitioner 404 partitions the cores of a printed circuit board into a first group (Group 1) and a second group (Group 2). (Block 508.) The example cores switcher 510 activates one of the groups of cores (e.g., Group 1) (block 510). The example timer/clock 408 monitors a duration of time starting at the time of activation. (Block 512). If the duration of time that has elapsed starting at the activation of the cores of Group 1 is not equal to a threshold amount of time (e.g., N/2), as determined by the timer/clock 408 (or the example cores switcher 406 based on an output of timer/clock 408) (block 514), the timer/clock 408 continues to monitor the duration of time elapsed from the activation of the cores of Group 1 (block 512).

When the duration of time is equal to N/2 (one-half the lifespan of the product), as determined by the example timer/clock 408 (or the example cores switcher 406 based on an output of timer/clock 408) (block 514), the cores switcher 406 responds by switching from the cores of the Group 1 to the cores of the Group 2 (e.g., the cores switcher 406 causes the cores of the Group 1 to be inactivated and causes the cores of the Group 2 to be activated) (block 516). In the meantime, the timer/clock 408 continues to monitor the elapsed time from the activation of the cores of Group 1. When the elapsed time is equal to N as determined by the timer/clock 408 (or the cores switcher 406 based on an output of the timer/clock 408) (block 518) the product has reached its lifespan and the execution of the portion of the program 500 that pertains to the selection of the first scheme ends. At that time, any number of actions may be taken with respect to the product including replacement, inactivation, upgrade, etc.

Referring still to FIG. 5A, if the policy selector 412 (FIG. 4), selects (based on programmed information and/or information from an input device), the second scheme (Scheme 2) (block 520), the example cores partitioner 404 partitions the cores of a printed circuit board into a first group of cores (Group 1) and a second group of cores (Group 2). (Block 522.) The example cores switcher 510 activates one of the groups of cores (e.g., Group 1), but does not activate a second one of the groups of cores (e.g., Group 2) (block 524). In some examples, the example timer/clock 408 initializes a counter denoted by the variable "i." (Block 526). The timer/clock also monitors a duration of time starting at the time of activation of the cores of Group 1. (Block 528.) In some examples, the duration of time that has elapsed starting at the activation of the cores of Group 1 is not equal to a threshold amount of time (e.g., N/2), as determined by the timer/clock 408 (or the example cores switcher 406 based on an output of the timer/clock 408) (block 530). In some such examples, the timer/clock 408 and/or cores switcher 406 determines whether the amount of time that has elapsed since the activation of the cores of Group 1 is equal to the value of the counter, i, multiplied by a threshold amount of time) (block 532). In some examples, the threshold is an amount of time equal to the lifespan "N" of the product divided by a whole number and represents an amount of time to be allowed to elapse between core switches executed by the core switcher 406. Thus, if the amount of elapsed time is equal to a threshold value, the cores switcher 406 executes a core switch (the active cores are deactivated and vice versa) (block 534). The timer/clock 408 increments the counter, i, by 1 (e.g., (i=i+1)) (block 536) and the timer/clock 408 again determines whether the time elapsed since the first cores activation is equal to N (Block 530). When the elapsed time is not equal to N, the program 500 re-executes the operations described with respect to the blocks 532, 534 and 536.

When the elapsed time is equal to N, the lifespan of the product in which the cores are installed is reached and the program 500 ends. Thereafter, any number of actions may be performed with respect to the product as described above.

Referring still to FIG. 5A, if the policy selector 412 (FIG. 4), (based on programmed information and/or information from an input device, or any of a variety of factors), does not select the second scheme (block 520), a third scheme (Scheme 3) is deployed and the program 500 continues from the marker A of FIG. 5A to the marker A of FIG. 5B. Thereafter, the example cores partitioner 404 partitions the cores of a printed circuit board into a set of round robin (RR) groups (block 538). In some examples, the RR groups each include two cores, though any other number of cores can instead be included in the RR groups. The example time/clock 408 initializes a counter denoted by the variable "i" to a value of 1 (Block 540). The value of the counter, "i," denotes the number of RR groups formed by the cores partitioner 404.

The example cores switcher 406 activates the cores of the RR groups except for the cores of the i-th RR group which are deactivated (block 542). As will be understood, at the inception of the first deactivation operation (block 522), none of the cores of the RR groups may be active such that the inactivation of the cores of the i-th RR group is not performed.

The example timer/clock 408 monitors an amount of elapsed time since the deactivation of the i-th RR group (block 544). In some examples, the timer/clock 408 and/or the cores switcher 406 determines whether the timer is equal to the value of the variable N, which as described above, denotes the value of the lifespan of the product (block 546). If so, the lifespan of the product has been reached and the portion of the program 500 associated with the third scheme is completed such that the program ends.

In some examples, the timer/clock 408 or the cores switcher 406 determines that the timer 408 has not reached the value N (block 546) and then determines whether the value of the timer is equal to the value of the counter, i, multiplied by a threshold value (block 548). In some examples, the threshold value is equal to a portion of the lifespan of the product and represents an amount of time between which the cores switcher 406 will perform cores switches. When the timer/clock 408 determines the timer is equal to (i×threshold) (block 548), the example timer/clock 408 causes the counter to be incremented by 1 (e.g., i=i+1) (block 550). The cores switcher 406 then executes another core switch by deactivating the i-th RR group of cores and activating the other RR groups of cores (block 542). Thereafter, the operations described with respect to blocks 544, 546 and 548 and 550 are repeated such that a next, i-th group of cores are deactivated, etc., until the amount of elapsed time since the activation of the first RR group of cores is equal to the lifespan of the product and the portion of the program 500 associated with the third scheme ends. As described above, after the program 500 ends, any of a variety of actions can be performed relative to the product.

Figure 6:
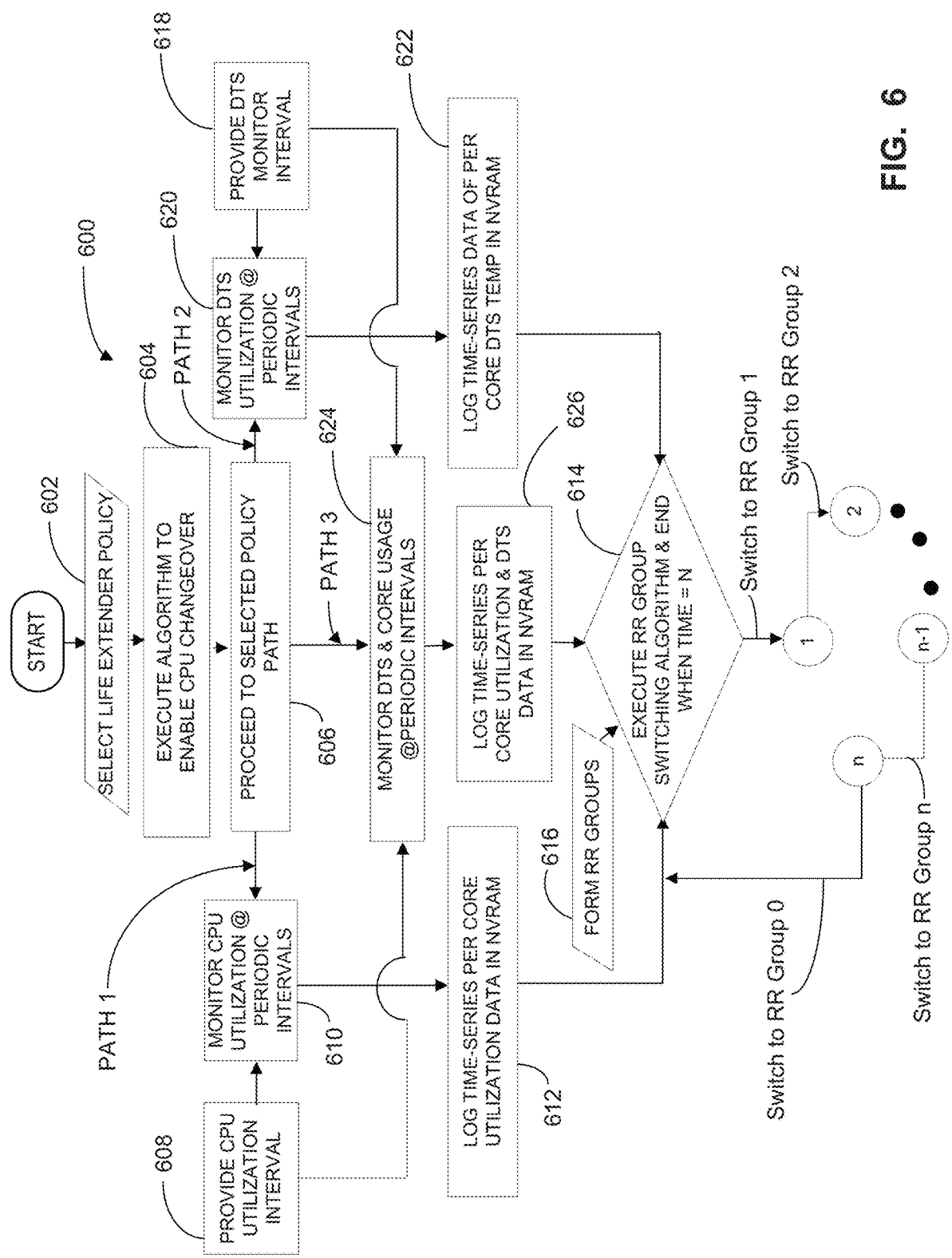
FIG. 6 is a flowchart representative of machine readable instructions which may be executed to implement any of the first, second third and/or fourth cores controller of any of FIGS. 1-4.

FIG. 6 is a program 600 that can be executed to implement any of the first, second, third and fourth cores controllers of any of FIGS. 1-4. In some examples, the program 600 can perform a number of different quality degradation monitoring reservation policies (QDMRP). In some examples, the program 600 begins at a block 602 at which the example policy selector 412 selects one of the life-extending policies (e.g., QDMRPs) based on a variety of factors as described above or based on an input provided at an input device. Based on the selected policy, or any of a variety of other factors, the example cores switchover configurer 424 executes an algorithm to enable CPU changeover/switchover (block 604). In some such examples, the cores switchover configurer 424 configures the cores of a product by, for example, configuring the cores to be communicate (directly or indirectly) with one another, configuring the cores to receive and respond appropriately to activation signals and/or inactivation signals, configuring memories and/or other parts of the cores to have the same addresses, and/or any other of a variety of configuration operations that prepare the cores for switching between inactive and active states. In some examples, the algorithms executed by the cores switchover configurer can be different based on which policy was selected by the policy selector 412.

Next a path, based on the selected policy (e.g., PATH 1, PATH 2, PATH 3), is chosen by the policy selector 602 (Block 606). In some examples, PATH 1 refers to a QDMRP that monitors CPU core utilization as an indicator of an amount of stress to which the CPU cores are subjected and makes cores switches based on the monitoring. Thus, when PATH 1 is chosen, a monitoring interval of time (also referred to as a CPU utilization interval) is provided by, for example, the cores switcher 406 (block 608) based on any number of factors including the capabilities of the CPU usage monitor 416, an environment in which the product is installed, an operating speed of the cores, etc. In some examples, the CPU utilization interval can be set at a time at which the product or cores are manufactured or can be set based on user input and/or programmed into the cores controller 402 of FIG. 4. Next, the CPU usage monitor 416 begins monitoring the CPU usage in accordance with the CPU utilization interval (block 610). The CPU usage monitoring data is supplied to the example time series data logger 420 of FIG. 4 which logs the data in a time-series format and stores the logged data in the example NVRAM 426 (block 612). The cores switcher 406 of FIG. 4 causes core switches to occur based on a workload distribution algorithm that uses the log time-series core utilization data (block 614). In some examples, the cores switcher algorithm causes switching groups of round robin (RR) cores formed/created by the cores partition 604 (616). In some examples, a different RR group is deactivated during each cores switch and the remaining ones of the RR group are activated (or, if already active, are not affected). In some examples, the cores switching algorithm limits the amount of time that the cores are experiencing high CPU usage. In some examples, the cores switcher 406 executes the algorithm until a target lifespan of the product (e.g., "N") has been reached, wherein the target lifespan exceeds the lifespan of the cores. When the target lifespan is reached, the cores switcher 406 halts execution of the algorithm and the portion of the program 600 associated with CPU usage monitoring ends.

In some examples, as described above, the example workload orchestrator 410, the example operations transfer orchestrator 422 and/or the cores switchover configurer are involved, as needed to achieve a smooth and properly balanced transfer of the workloads, during a cores switch.

In some examples, PATH 2 is chosen based on the selected life extender policy (see block 602). In some examples, PATH 2 corresponds to a QDMRP that monitors core operating temperatures based on information collected by the example digital thermal sensor (DTS) monitor 418 of FIG. 4. Thus, when PATH 2 is chosen, a monitoring interval of time (also referred to as a DTS monitor interval) is provided by, for example, the cores switcher 406 (block 618) based on any number of factors including the capabilities of the digital thermal sensors, an environment in which the product is installed, an operating speed of the cores, etc. In some examples, the DTS monitor interval can be set at a time at which the product or cores are manufactured or can be set based on user input and/or programmed into the cores controller 402 of FIG. 4. Next, the DTS monitor 418 begins monitoring data provided by the digital thermal sensors in accordance with the DTS monitoring interval (block 620). The DTS monitoring data is supplied to the example time series data logger 420 of FIG. 4 which logs the data in a time-series format and stores the logged data in the example NVRAM 426 (block 622).

The cores switcher 406 of FIG. 4 causes core switches to occur based on a workload distribution algorithm that uses the log time-series DTS data (block 614). As described above, the cores switcher algorithm causes the switching groups of round robin (RR) cores formed/created by the cores partition 604 (616). In some examples, a different RR group is deactivated during each cores switch and the remaining ones of the RR group are activated (or, if already active, are not affected). In some examples, the cores switching algorithm limits the amount of time that the cores are exposed to high temperatures associated with silicon degradation. In some examples, the cores switcher 406 executes the algorithm until a target lifespan of the product (e.g., "N") has been reached, wherein the target lifespan exceeds the lifespan of the cores. When the target lifespan is reached, the cores switcher 406 halts execution of the algorithm and the portion of the program 600 associated with CPU usage monitoring ends.

The distribution of the workloads and intermittent core switching based on both the DTS monitoring data and the CPU core utilization data can ensure that the lifespan of the individual CPUs is extended to at least ten years (which exceeds a lifespan that would otherwise be achieved absent the application of the third QDMRP policy). TABLE 3 below presents example time series log data collected in connection with the third QDMRP policy.

In some examples, PATH 3 is chosen based on the policy selected by or at selected life extender policy (see block 602). In some examples, PATH 3 corresponds to a QDMRP that monitors both core operating temperatures and core usage data based on information collected by the example CPU usage monitor 416 and the example digital thermal sensor (DTS) monitor 418, respectively. Thus, when PATH 3 is chosen, the temperature monitoring interval of time (also referred to as a DTS monitor interval) and the CPU utilization monitoring interval are provided by, for example, the cores switcher 406 (block 608 and block 618). Next, the DTS monitor 418 and the CPU usage monitor 416 begin monitoring data provided by the digital thermal sensors and the CPUs in accordance with the respective, corresponding time intervals. (Block 624). The monitoring data is supplied to the example time series data logger 420 of FIG. 4 which logs the data in a time-series format and stores the logged data in the example NVRAM 426 (block 626).

The cores switcher 406 of FIG. 4 causes core switches to occur based on a workload distribution algorithm that uses the log time-series DTS data (block 614). As described above, the cores switcher algorithm causes the switching groups of round robin (RR) cores formed/created by the cores partition 604 (616). In some examples, a different RR group is deactivated during each cores switch and the remaining ones of the RR group are activated (or, if already active, are not affected). In some examples, the cores switching algorithm operates to strategically switch the cores in a manner that limits the amount of time that the cores are exposed to high temperatures and the amount of time that the cores are experiencing high workload demand. In some examples, the cores switcher 406 executes the algorithm until a target lifespan of the product (e.g., "N") has been reached, wherein the target lifespan exceeds the lifespan of the cores. When the target lifespan is reached, the cores switcher 406 halts execution of the algorithm and the portion of the program 600 associated with CPU usage monitoring ends.

As will be understood the switching algorithm executed by the cores controller 614 can vary based on the PATH chosen at the policy selector 412 of FIG. 4. In some examples, the policy selector 412 notifies other components of the cores controller 402 so that the proper algorithm is executed using appropriate data.

Figure 7:
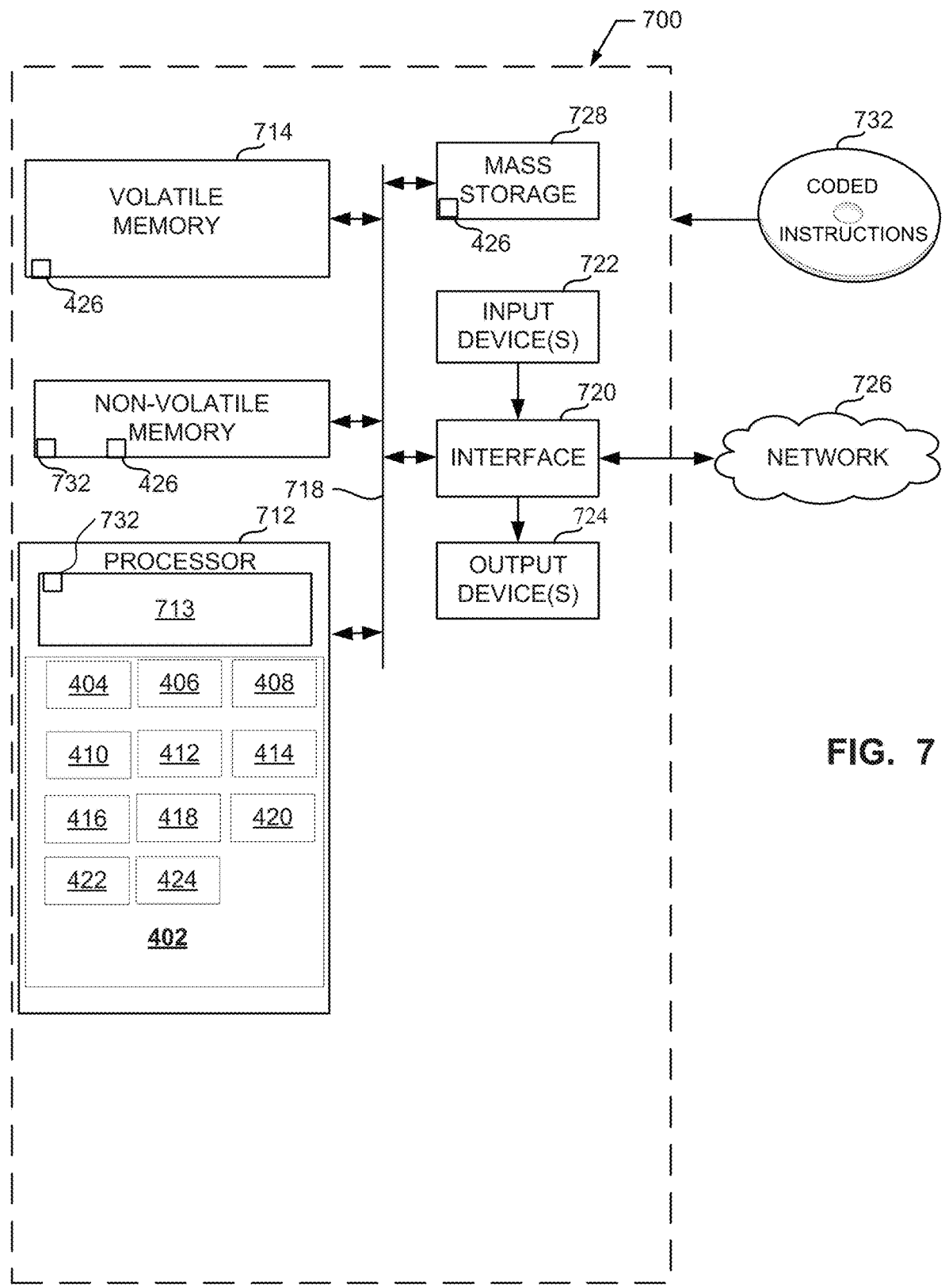
FIG. 7 is a block diagram of an example processing platform structured to execute the instructions of FIGS. 5A, 5B and 6 to implement any of the first, second and/or third cores controller of any of FIGS. 1-3.

FIG. 7 is a block diagram of an example processor platform 700 structured to execute the instructions of FIGS. 5A, 5B, and 6 to implement the cores controller 402 of FIG. 4. The processor platform 700 can be, for example, a programmable logic controller (PLC), a programmable automation controller (PAC), an embedded controller (EC), and industrial PC (IPC), a Human Machine Interface (HMI), a server, a personal computer, a workstation, a self-learning machine (e.g., a neural network), a mobile device (e.g., a cell phone, a smart phone, a tablet such as an iPad), a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example cores partitioner 404, the example cores switcher 406, the example timer/clock 408, the example workload orchestrator 410, the example policy selector 412, the example subset selector 414, the example CPU usage monitor 416, the example digital thermal sensor 418, the example time series data logger 420, the example operations transfer orchestrator 422, and the example cores switchover configurer 424, and/or, more generally, the example cores controller 402 of FIG. 4.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller. In some examples, the non-volatile memory 716 can implement the NVRAM 426 of FIG. 4.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5A, 5B, and 6 may be stored in the mass storage device 728, in the volatile memory 714, in the non-volatile memory 716, and/or on a removable non-transitory computer readable storage medium such as a CD or DVD.

Figure 8:
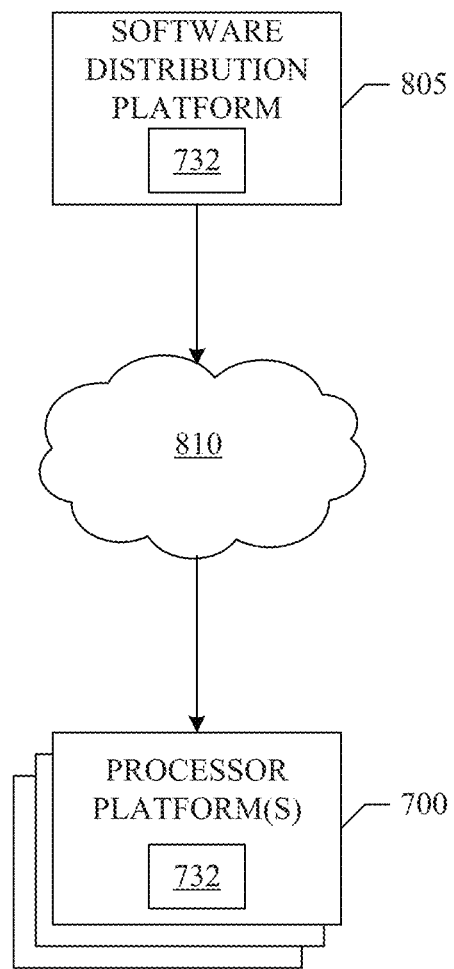
FIG. 8 is a block diagram of an example software distribution platform to distribute software (e.g., software corresponding to the example computer readable instructions of FIGS. 5A, 5B, and 6 to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).
Figure 9:
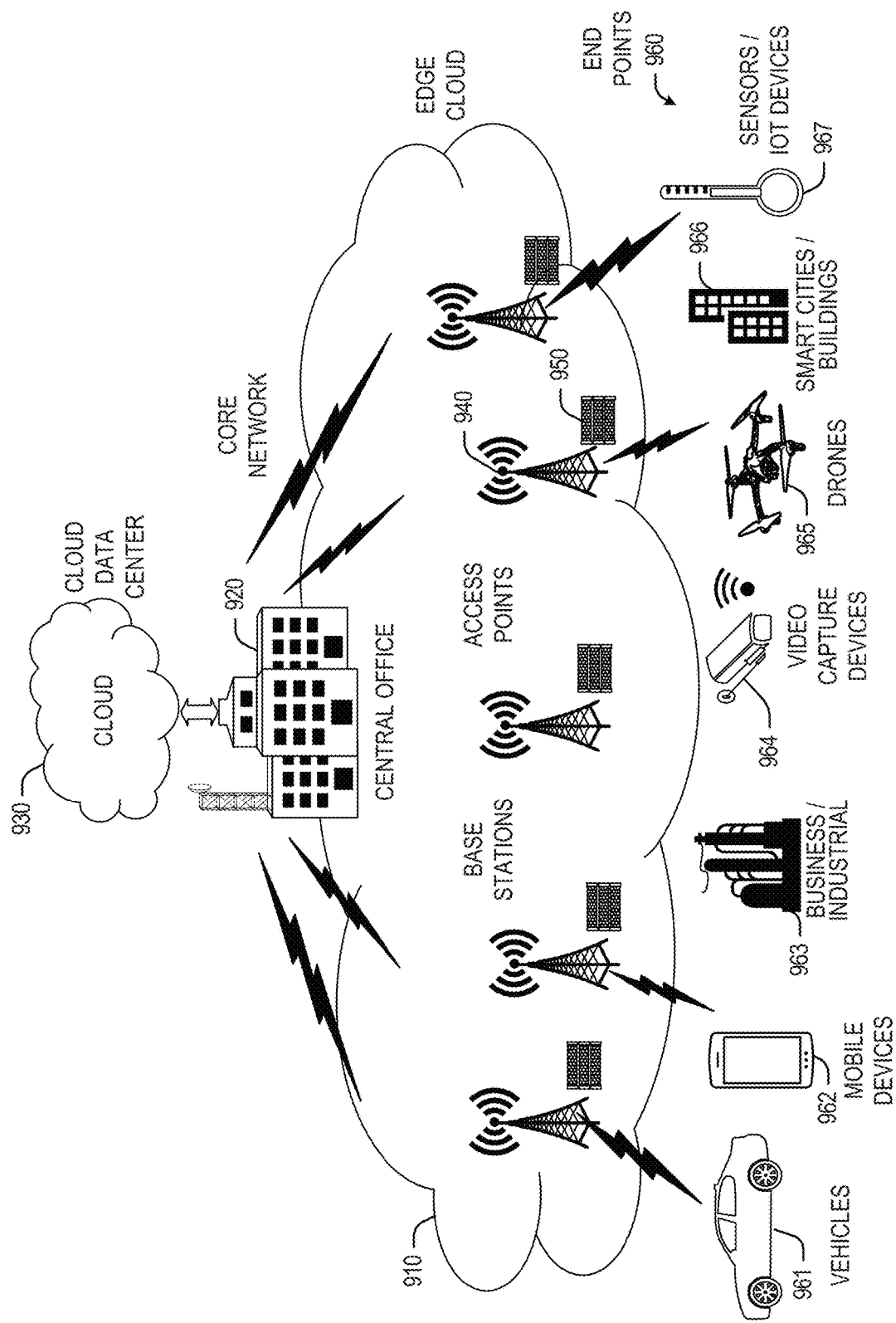
FIG. 9 illustrates an overview of an edge cloud configuration for edge computing.

FIGS. 7, 8, and 9 illustrate environments in which the apparatus, systems, methods and articles of manufacture can be implemented. For example, a block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions 500 and 600 of FIGS. 5A, 5B and 6, as described above. The one or more servers of the example software distribution platform 805 are in communication with a network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions 500 and 600 of FIGS. 5A, 5B and 6, may be downloaded to the example processor platform 1000, which is to execute the computer readable instructions 732 to implement the example cores partitioner 404, the example cores switcher 406, the example timer/clock 408, the example workload orchestrator 410, the example policy selector 412, the example subset selector 414, the example CPU usage monitor 416, the example digital thermal sensor 418, the example time series data logger 420, the example operations transfer orchestrator 422, and the example cores switchover configurer 424, and/or, more generally, the example cores controller 402 of FIG. 4. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

FIG. 9 is a block diagram 900 showing an overview of a configuration for edge computing, which includes a layer of processing referred to in many of the following examples as an "edge cloud". As shown, the edge cloud 910 is co-located at an edge location, such as an access point or base station 940, a local processing hub 950, or a central office 920, and thus may include multiple entities, devices, and equipment instances. The edge cloud 910 is located much closer to the endpoint (consumer and producer) data sources 960 (e.g., autonomous vehicles 961, user equipment 962, business and industrial equipment 963, video capture devices 964, drones 965, smart cities and building devices 966, sensors and IoT devices 967, etc.) than the cloud data center 930. Compute, memory, and storage resources which are offered at the edges in the edge cloud 910 are critical to providing ultra-low latency response times for services and functions used by the endpoint data sources 960 as well as reduce network backhaul traffic from the edge cloud 910 toward cloud data center 930 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 10:
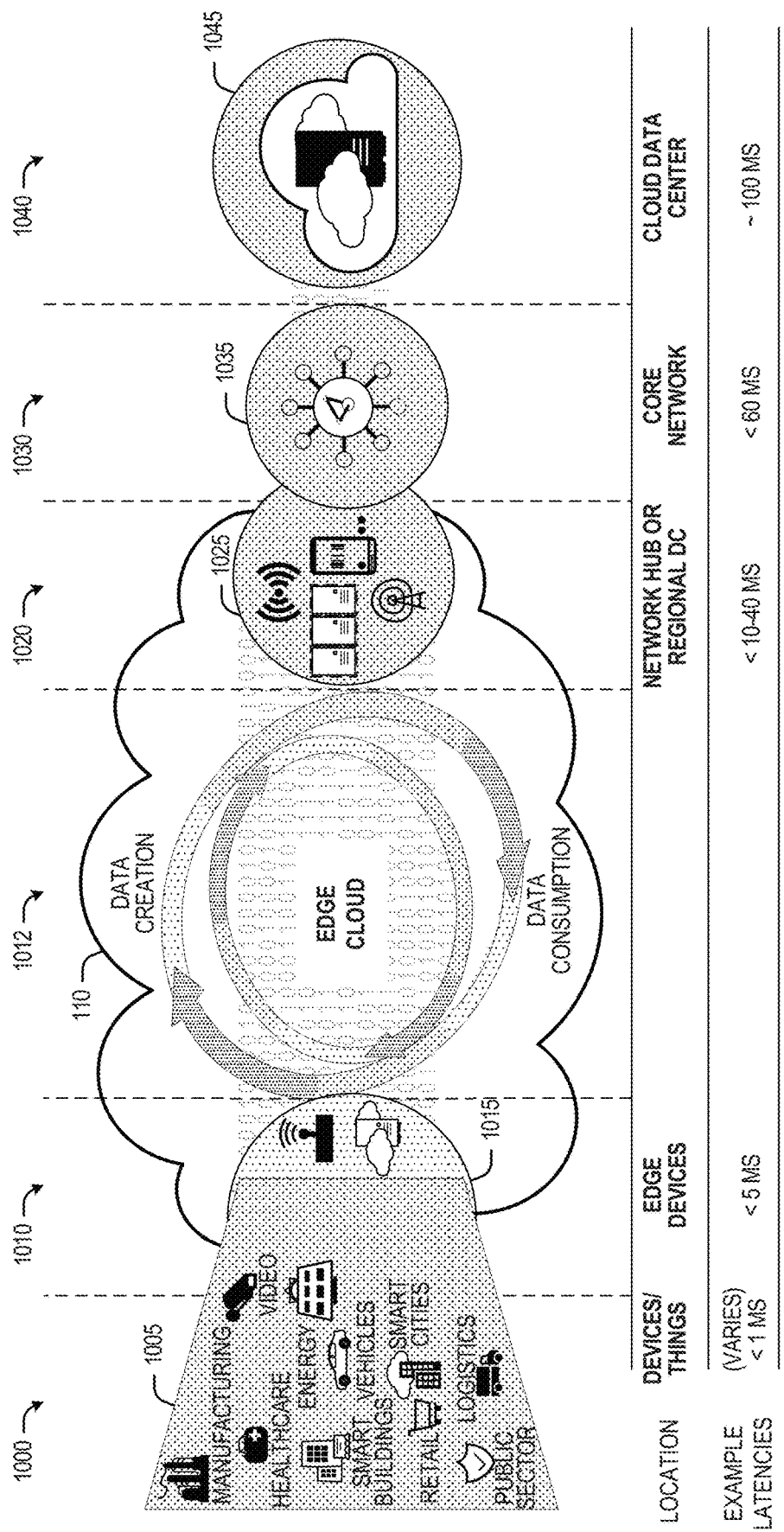
FIG. 10 illustrates operational layers among endpoints, an edge cloud, and cloud computing environments.

FIG. 10 illustrates operational layers among endpoints, an edge cloud, and cloud computing environments. Specifically, FIG. 10 depicts examples of computational use cases 1005, utilizing the edge cloud 910 among multiple illustrative layers of network computing. The layers begin at an endpoint (devices and things) layer 1000, which accesses the edge cloud 910 to conduct data creation, analysis, and data consumption activities. The edge cloud 910 may span multiple network layers, such as an edge devices layer 1010 having gateways, on-premise servers, or network equipment (nodes 1015) located in physically proximate edge systems; a network access layer 1020, encompassing base stations, radio processing units, network hubs, regional data centers (DC), or local network equipment (equipment 1025); and any equipment, devices, or nodes located therebetween (in layer 1012, not illustrated in detail). The network communications within the edge cloud 910 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1000, under 5 ms at the edge devices layer 1010, to even between 10 to 40 ms when communicating with nodes at the network access layer 1020. Beyond the edge cloud 910 are core network 1030 and cloud data center 1040 layers, each with increasing latency (e.g., between 50-60 ms at the core network layer 1030, to 100 or more ms at the cloud data center layer). As a result, operations at a core network data center 1035 or a cloud data center 1045, with latencies of at least 50 to 100 ms or more, will not be able to accomplish many time-critical functions of the use cases 1005. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1035 or a cloud data center 1045, a central office or content data network may be considered as being located within a "near edge" layer ("near" to the cloud, having high latency values when communicating with the devices and endpoints of the use cases 1005), whereas an access point, base station, on-premise server, or network gateway may be considered as located within a "far edge" layer ("far" from the cloud, having low latency values when communicating with the devices and endpoints of the use cases 1005). It will be understood that other categorizations of a particular network layer as constituting a "close", "local", "near", "middle", or "far" edge may be based on latency, distance, number of network hops, or other measurable characteristics, as measured from a source in any of the network layers 1000-1040.

The various use cases 1005 may access resources under usage pressure from incoming streams, due to multiple services utilizing the edge cloud. To achieve results with low latency, the services executed within the edge cloud 910 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 910 may provide the ability to serve and respond to multiple applications of the use cases 1005 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 910 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 910 (network layers 1000-1040), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 910.

As such, the edge cloud 910 is formed from network components and functional features operated by and within edge gateway nodes, edge aggregation nodes, or other edge compute nodes among network layers 1010-1030. The edge cloud 910 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 910 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 910 may be servers, multi-tenant servers, appliance computing devices, and/or any other type of computing devices. For example, the edge cloud 910 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7. The edge cloud 910 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 11:
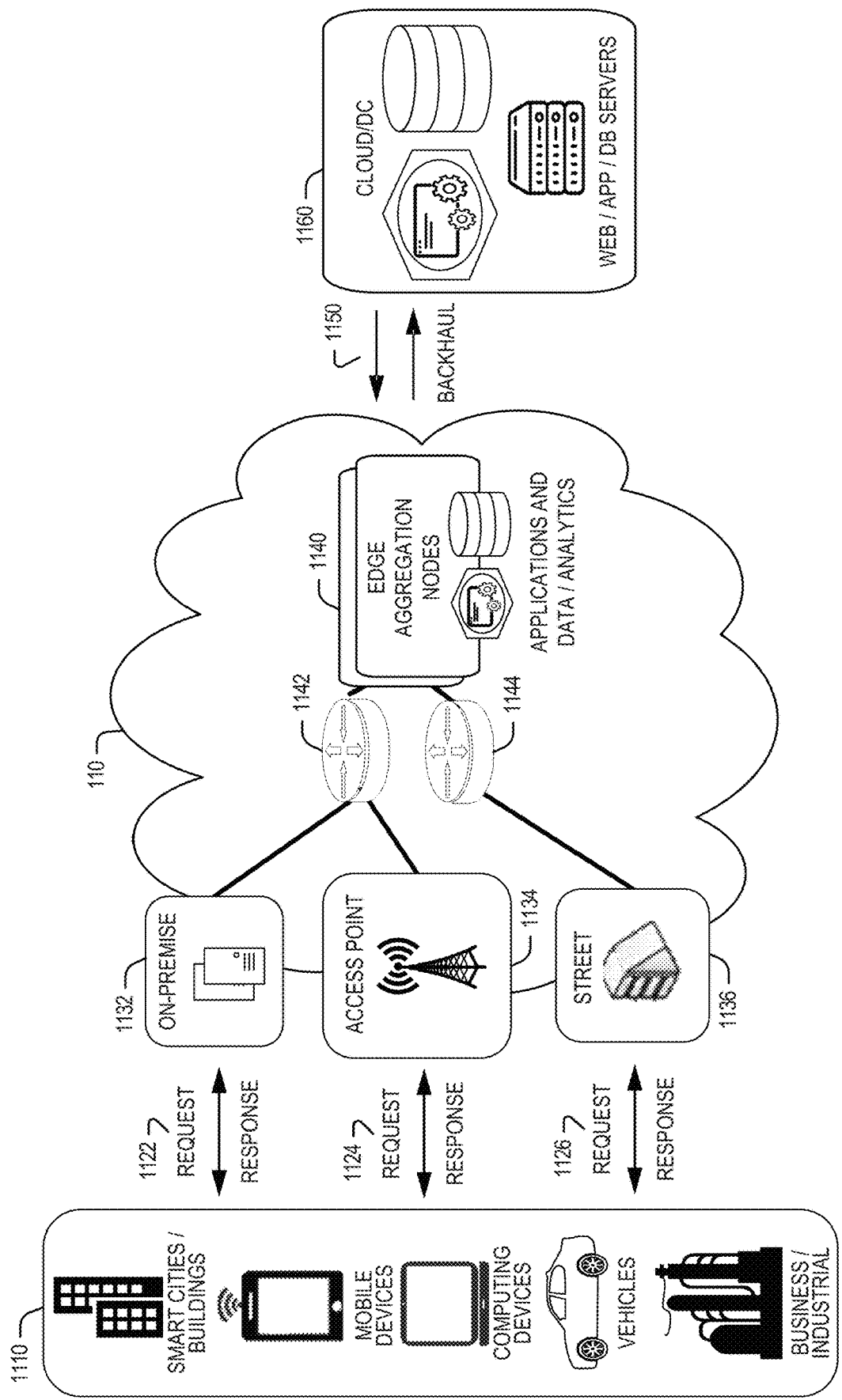
FIG. 11 illustrates an example approach for networking and services in an edge computing system.

In FIG. 11, various client endpoints 1110 (in the form of mobile devices, computers, autonomous vehicles, business computing equipment, industrial processing equipment) exchange requests and responses that are specific to the type of endpoint network aggregation. For instance, client endpoints 1110 may obtain network access via a wired broadband network, by exchanging requests and responses 1122 through an on-premise network system 1132. Some client endpoints 1110, such as mobile computing devices, may obtain network access via a wireless broadband network, by exchanging requests and responses 1124 through an access point (e.g., cellular network tower) 1134. Some client endpoints 1110, such as autonomous vehicles may obtain network access for requests and responses 1126 via a wireless vehicular network through a street-located network system 1136. However, regardless of the type of network access, the TSP may deploy aggregation points 1142, 1144 within the edge cloud 910 to aggregate traffic and requests. Thus, within the edge cloud 910, the TSP may deploy various compute and storage resources, such as at edge aggregation nodes 1140, to provide requested content. The edge aggregation nodes 1140 and other systems of the edge cloud 910 are connected to a cloud or data center 1160, which uses a backhaul network 1150 to fulfill higher-latency requests from a cloud/data center for websites, applications, database servers, etc. Additional or consolidated instances of the edge aggregation nodes 1140 and the aggregation points 1142, 1144, including those deployed on a single server framework, may also be present within the edge cloud 910 or other areas of the TSP infrastructure.

From the foregoing, it will be appreciated that example methods, apparatus and articles of manufacture have been disclosed that extended the lifespan of CPU cores through strategic switching of core usage. The disclosed methods, apparatus and articles of manufacture improve the efficiency of using a computing device by extending the lifespan of a product that incorporates the computing device. In addition, the disclosed methods, systems, apparatus and articles of manufacture cause cores to experience less degradation from high temperatures and heavy workloads and thereby can permit the usage of commercial grade cores in industrial applications. As a result, there is less downtime as products using the methods, apparatus, systems and articles of manufacture disclosed herein require less frequent replacement. Moreover, because commercial grade cores are less expensive to manufacture than industrial grade cores, the methods, apparatus, systems, and articles of manufacture also provide a cost saving. The disclosed methods, apparatus and articles of manufacture are accordingly directed to one or more improvement(s) in the functioning of a computer.

Example methods, apparatus, systems, and articles of manufacture to extend the lifespan of embedded processors are disclosed herein. Further examples and combinations thereof include the following:

Example 1 includes an apparatus having a policy selector to select a policy, based on input information. The policy extends an operating lifespan of a microprocessor having a plurality of cores. The apparatus also includes a cores partitioner to divide, based on the selected policy, the plurality of cores of the microprocessor into subsets of cores, including a first subset and a second subset. A sensor monitors, based on the selected policy, at least one operational parameter of the plurality of cores. A cores switcher switches a first core of the first subset of cores from active to inactive and to switch a second core of the second subset of cores from inactive to active based on the at least one operational parameter. In Example 1, the core switches reduce an amount of degradation experienced by the first core and the second core.

Example 2 includes the apparatus of example 1. In example 2, the input information on which selection of the policy is based includes at least one of a user preference, a type of product in which the microprocessor is installed, an application in which the product is to operate, or an environment in which the product is to operate.

Example 3 includes the apparatus of example 1. In example 3, at least some of the plurality of cores are inactive and at least some of the plurality of cores are active during operation of the microprocessor.

Example 4 includes the apparatus of example 1. In example 4, the plurality of cores are rated to operate in a first environment at a first temperature, are operating in a second environment at a second temperature, the second temperature accelerates degradation of silicon of the plurality of cores, the second temperature is higher than the first temperature, and the cores switcher operates to limit an amount of time that any of the plurality cores operate in the second environment.

Example 5 includes the apparatus of example 1. The apparatus of example 5 further includes an operations transfer orchestrator to orchestrate a transfer of operations by which operations performed at the first core are to be transferred to the second core. The operations transfer orchestrator orchestrates the transfer of operations in response to a notification from the cores switcher and the operations to be transferred before the first core is switched to inactive and after the second core is switched to active.

Example 6 includes the apparatus of example 1. The apparatus of example 6, further includes a workload orchestrator that compares a workload of the first core to a workload capacity of the second core. The comparison is used by the cores switcher to determine whether the second core has sufficient capacity for the workload of the first core before issuing a switch command. The cores switcher issues the switch command when the second core is determined to have sufficient capacity for the workload of the first core.

Example 7 includes the apparatus of example 1 and further includes a cores switchover configurer that configures the first core and the second core to switch between inactive and active states. The configuring performed by the cores switchover configurer includes at least one of (i) configuring the first core and the second core to communicate with one another, (ii) configuring the first core and the second core to receive and respond to activation signals and inactivation signals, or (iii) configuring memories associated with the first core and the second core to have the same addresses.

Example 8 includes the apparatus of example 1. In example 8, the sensor includes a plurality of sensors, and the operational parameters include at least one of temperature, time, or core usage.

Example 9 includes the apparatus of example 8. In example 9, the plurality of sensors includes at least one of a core usage sensor, a digital thermal sensor, or a timer. In example 9, the digital thermal sensor senses a junction temperature associated with the plurality of cores, the core usage sensor measures at least one of respective workloads of respective ones of the cores or respective operating speeds of the respective ones of the cores, and the timer measure an amount of operating time of the cores.

Example 10 includes the apparatus of example 1 and further includes a subset selector to select at least two subsets of cores for switching.

Example 11 includes the apparatus of example 1 and further includes a time-series logger that generates a time-series log of data collected by one or more sensors. In example 11, the data is used to compare a first operational parameter of a first core with the first operational parameter of the second core and the first operational parameter of the first core and the second core are sensed at a same time. In example 11, the comparison is used by the cores switcher to identify a time to switch the first core from active to inactive and to switch the second core from inactive to active.

Example 12 includes the apparatus of example 1. In example 12, the first subset of cores are active and the second subset of cores are inactive. Also, the cores switcher switches the first subset of cores to inactive and the second subset of cores to active after expiration of a timer. In example 12, the timer expires when a time equal to an expected lifespan of the plurality of cores has been reached.

Example 13 includes the apparatus of example 1. In example 13, the at least one operational parameter reflects an amount of quality degradation of the plurality of cores caused by one or more of a core temperature, a core operating voltage, a core operating frequency, and a core workload stress, and the quality degradation adversely affects the operating lifespan of the plurality of cores.

Example 14 includes the apparatus of example 1. In example 14, the cores switcher switches the first core from active to inactive and switches the second core from inactive to active by executing an algorithm that uses a combination of a first series of core usage values and a first series of core temperature values.

Example 15 includes at least one non-transitory computer readable medium having instructions that, when executed, cause at least one processor to at least select a policy, based on input information. The policy extends the operating lifespan of a microprocessor having a plurality of cores. In addition, the instructions cause the at least one processor to divide, based on the selected policy, the plurality of cores of the microprocessor into subsets of core, including a first subset and a second subset. The instructions also cause the at least one processor to monitor, based on the selected policy and sensed information received from one or more sensors, at least one operational parameter of the plurality of cores. The instructions further cause the at least one processor to switch a first core of the first subset of cores from active to inactive, and switch a second core of the second subset of cores from inactive to active based on the at least one operational parameter. The switch of the first core and the second core reduces an amount of degradation experienced by the first core and the second core.

Example 16 includes the at least one non-transitory computer readable medium of example 15. In example 16, the input information on which selection of the policy is based includes at least one of a user preference, a type of product in which the microprocessor is installed, an application in which the product is to operate, or an environment in which the product is to operate.

Example 17 includes the at least one non-transitory computer readable medium of example 15. In example 17, at least some of the plurality of cores are inactive and at least some of the plurality of cores are active during operation of the microprocessor.

Example 18 includes the at least one non-transitory computer readable medium of example 15. In example 18, the plurality of cores are rated to operate in a first environment at a first temperature, and are operating in a second environment at a second temperature. In example 18, the second temperature accelerates degradation of silicon of the plurality of cores and is higher than the first temperature. In example 18, switching the state of any of the plurality of cores from an inactive to an active state and vice versa limits an amount of time that any of the plurality cores operate in the second environment.

Example 19 includes the at least one non-transitory computer readable medium of example 15. In example 19, the instructions further cause the at least one processor to orchestrate the transfer of operations in response to a notification that a switch is to occur. The operations are transferred before the first core is switched to inactive and after the second core is switched to active.

Example 20 includes the at least one non-transitory computer readable medium of example 15, wherein the instructions further cause the at least one processor to compare a workload of the first core to a workload capacity of the second core, the comparison to be used to determine whether the second core has sufficient capacity for the workload of the first core before a switch is to occur. In example 20, the switch occurs when the second core is determined to have sufficient capacity for the workload of the first core.

Example 21 includes the at least one non-transitory computer readable medium of example 9, wherein the instructions further cause the at least one processor to configure the first core and the second core to switch between inactive and active states. In example 21, configuring of the first and second cores includes at least one of (i) configuring the first core and the second core to communicate with one another, (ii) configuring the first core and the second core to receive and respond to activation signals and inactivation signals, or (iii) configuring memories associated with the first core and the second core to have the same addresses.

Example 22 includes the at least one non-transitory computer readable medium of example 15. In example 22, the sensor includes a plurality of sensors, and the operational parameters include at least one of temperature, time, or core usage.

Example 23 includes the at least one non-transitory computer readable medium of example 21. In example 23, the plurality of sensors includes at least one of a core usage sensor, a digital thermal sensor, or a timer. In example 23, the digital thermal sensor senses a junction temperature associated with the plurality of cores, and the core usage sensor measures at least one of respective workloads of respective ones of the cores or respective operating speeds of the respective ones of the cores.

Example 24 includes the at least one non-transitory computer readable medium of example 15. In example 24, the sensor is one of a plurality of sensors and the instructions further cause the at least one processor to generate a time-series log of data collected by the plurality of sensors. The collected data is used to compare a first operational parameter of a first core with the first operational parameter of the second core. In example 24, the first operational parameter of the first core and the second core is sensed at a same time and the comparison is used to identify a time to switch the first core from active to inactive and to switch the second core from inactive to active.

Example 25 includes the at least one non-transitory computer readable medium of example 15. In example 25, the first subset of cores are active and the second subset of cores are inactive. In addition, the first subset of cores are switched to inactive and the second subset of cores are switched to active after a duration of time equal to an expected lifespan of the plurality of cores.

Example 26 includes the at least one non-transitory computer readable medium of example 15. In example 26, the at least one operational parameter reflects an amount of quality degradation of the plurality of cores caused by one or more of a core temperature, a core operating voltage, a core operating frequency, and a core workload stress. The quality degradation adversely affects the operating lifespan of the plurality of cores.

Example 27 includes the at least one non-transitory computer readable medium of example 15. In example 27, the instructions further to cause the at least one processor to execute an algorithm that uses a combination of a first series of core usage values and a first series of core temperature values to determine when the first core is to be switched from active to inactive and the second core is to be switched from inactive to active.

Example 28 includes a method that includes selecting a policy, based on input information. The policy of example 28 extends the operating lifespan of a microprocessor having a plurality of cores. The method of example 28 also includes dividing, based on the selected policy, the plurality of cores of the microprocessor into subsets of core, including a first subset and a second subset. Monitoring is performed, based on the selected policy and sensed information received from one or more sensors. At least one operational parameter of the plurality of cores is monitored. The method of example 28 further includes switching a first core of the first subset of cores from active to inactive, and switching a second core of the second subset of cores from inactive to active based on the at least one operational parameter. In example 28, the switch of the first core and the second core reduces an amount of degradation experienced by the first core and the second core.

Example 29 includes the method of example 28. In example 29, the input information on which selection of the policy is based includes at least one of a user preference, a type of product in which the microprocessor is installed, an application in which the product is to operate, or an environment in which the product is to operate.

Example 30 includes the method of example 28. In example 30, at least some of the plurality of cores are inactive and at least some of the plurality of cores are active during operation of the microprocessor.

Example 31 includes the method of example 28. In example 31, the plurality of cores are rated to operate in a first environment at a first temperature and are operating in a second environment at a second temperature higher than the first temperature. Further, the second temperature accelerates degradation of silicon of the plurality of cores, and the switching of the plurality of the cores from an inactive to active and vice versa limits an amount of time that any of the plurality cores operate in the second environment.

Example 32 includes the method of example 28 and further includes orchestrating the transfer of operations in response to a notification that a core switch is to occur. In example 32, the operations are to be transferred before the first core is switched to inactive and after the second core is switched to active.

Example 33 includes the method of example 28 and further includes comparing a workload of the first core to a workload capacity of the second core. The comparison is used to determine whether the second core has sufficient capacity for the workload of the first core before a switch is to occur. The switch occurs when the second core is determined to have sufficient capacity for the workload of the first core.

Example 34 includes the method of example 28 and further includes configuring the first core and the second core to switch between inactive and active states. The configuring of the first and second cores includes at least one of (i) configuring the first core and the second core to communicate with one another, (ii) configuring the first core and the second core to receive and respond to activation signals and inactivation signals, or (iii) configuring memories associated with the first core and the second core to have the same addresses.

Example 35 includes the method of example 28. In example 35, the sensor includes a plurality of sensors, and the operational parameters include at least one of temperature, time, or core usage.

Example 36 includes the method of example 35. In example 36, the plurality of sensors includes at least one of a core usage sensor, a digital thermal sensor, or a timer. In addition, the digital thermal sensor senses a junction temperature associated with the plurality of cores, and the core usage sensor measures at least one of respective workloads of respective ones of the cores or respective operating speeds of the respective ones of the cores.

Example 37 includes the method of example 28. In example 37, the sensor is one of a plurality of sensors, and the method further includes generating a time-series log of data collected by the plurality of sensors. In example 37, the data is used to compare a first operational parameter of a first core with the first operational parameter of the second core, the first operational parameter of the first core and the second core are sensed at a same time and the comparison is used to identify a time to switch the first core from active to inactive and to switch the second core from inactive to active.

Example 38 includes the method of example 28. In example 38, the first subset of cores are active and the second subset of cores are inactive and a first switch of the first subset of cores to inactive and a second switch of the second subset of cores to active occurs after a duration of time equal to an expected lifespan of the plurality of cores.

Example 39 includes the method of example 28. In example 39, the at least one operational parameter reflects an amount of quality degradation of the plurality of cores caused by one or more of a core temperature, a core operating voltage, a core operating frequency, and a core workload stress. In example 39, the quality degradation adversely affects the operating lifespan of the plurality of cores.

Example 40 includes the method of example 28 and further includes executing an algorithm that uses a combination of a first series of core usage values and a first series of core temperature values to determine when the first core is to be switched from active to inactive and the second core is to be switched from inactive to active.

Example 41 includes an apparatus having a means for selecting a policy based on input information. The policy extends an operating lifespan of a microprocessor having a plurality of cores. The apparatus also includes a means for dividing (or partitioning), based on the selected policy, the plurality of cores of the microprocessor into subsets of cores, including a first subset and a second subset. In example 41, a means for sensing monitors, based on the selected policy, at least one operational parameter of the plurality of cores. In addition, a means for switching cores switches a first core of the first subset of cores from active to inactive and switches a second core of the second subset of cores from inactive to active based on the at least one operational parameter. In Example 41, the core switches reduce an amount of degradation experienced by the first core and the second core.

Example 42 includes the apparatus of example 41. In the apparatus of example 42 a means to orchestrate a transfer of operations orchestrates a transfer of operations by which operations performed at the first core are to be transferred to the second core. The transfer of operations is performed in response to a notification from the cores switcher and the operations are transferred before the first core is switched to inactive and after the second core is switched to active.

Example 43 includes the apparatus of example 41. The apparatus of example 43, further includes a means to orchestrate a workload that compares a workload of the first core to a workload capacity of the second core. The comparison is used by the means to switch cores to determine whether the second core has sufficient capacity for the workload of the first core before issuing a switch command. The means to switch cores issues the switch command when the second core is determined to have sufficient capacity for the workload of the first core.

Example 44 includes the apparatus of example 41 and further includes a means to configure a cores switchover that configures the first core and the second core to switch between inactive and active states. The configuring performed by the cores switchover configurer includes at least one of (i) configuring the first core and the second core to communicate with one another, (ii) configuring the first core and the second core to receive and respond to activation signals and inactivation signals, or (iii) configuring memories associated with the first core and the second core to have the same addresses.

Example 45 includes the apparatus of example 41. In example 45, the means for monitoring is performed by a sensor and the sensor includes a plurality of sensors. In example 45, the plurality of sensors includes at least one of a core usage sensor, a digital thermal sensor, or a timer. In example 45, the digital thermal sensor senses a junction temperature associated with the plurality of cores, the core usage sensor measures at least one of respective workloads of respective ones of the cores or respective operating speeds of the respective ones of the cores, and the timer measure an amount of operating time of the cores.

Example 46 includes the apparatus of example 41 and further includes a means to log time-series data that generates a time-series log of data collected by one or more sensors. In example 46, the time-series log of data is used to compare a first operational parameter of a first core with the first operational parameter of the second core and the first operational parameter of the first core and the second core are sensed at a same time. In example 46, the comparison is used identify a time to switch the first core from active to inactive and to switch the second core from inactive to active.

Example 47 includes the apparatus of example 41. In example 41, the first subset of cores are active and the second subset of cores are inactive. Also, the means for core switching switches the first subset of cores to inactive and the second subset of cores to active after expiration of a timer. In example 47, the timer expires when a time equal to an expected lifespan of the plurality of cores has been reached.

Example 48 includes the apparatus of example 41. In example 48, the at least one operational parameter reflects an amount of quality degradation of the plurality of cores caused by one or more of a core temperature, a core operating voltage, a core operating frequency, and a core workload stress, and the quality degradation adversely affects the operating lifespan of the plurality of cores.

Example 49 includes the apparatus of examples 1 and further includes the apparatus of any one of examples 2-8, and 10-14.

Example 50 includes the at least one non-transitory computer readable medium of example 15 and further includes the at least one non-transitory computer readable medium of any one of examples 16-22 and 24-27.

Example 51 includes the method of claim 28 and further includes the methods of any one of examples 29-35, and 37-40.

Example 52 includes the apparatus of example 41 and further includes the apparatus of any one of examples 42-48.

Example 53 is a computer readable medium having computer readable instructions that, when executed, cause at least one processor to perform the method of any one of examples 28-40.

Example 54 is at least one machine-readable medium including instructions that, when executed by processing circuitry, cause the processing circuitry to perform operations to implement any of Examples 1-52.

Example 55 is an apparatus comprising means to implement any of Examples 1-81.

Example 56 is a system to implement any of Examples 1-81.

Example 57 is a method to implement any of Examples 1-81.

Example 58 is a multi-tier edge computing system, comprising a plurality of edge computing nodes provided among on-premise edge, network access edge, or near edge computing settings, the plurality of edge computing nodes configured to perform any of the methods of Examples 1-52.

Example 59 is an edge computing system, comprising a plurality of edge computing nodes, each of the plurality of edge computing nodes configured to perform any of the methods of Examples 1-52.

Example 60 is an edge computing node, operable as a server hosting the service and a plurality of additional services in an edge computing system, configured to perform any of the methods of Examples 1-52.

Example 61 is an edge computing node, operable in a layer of an edge computing network as an aggregation node, network hub node, gateway node, or core data processing node, configured to perform any of the methods of Examples 1-52.

Example 62 is an edge provisioning, orchestration, or management node, operable in an edge computing system, configured to implement any of the methods of Examples 1-52.

Example 63 is an edge computing network, comprising networking and processing components configured to provide or operate a communications network, to enable an edge computing system to implement any of the methods of Examples 1-52.

Example 64 is an access point, comprising networking and processing components configured to provide or operate a communications network, to enable an edge computing system to implement any of the methods of Examples 1-52.

Example 65 is a base station, comprising networking and processing components configured to provide or operate a communications network, configured as an edge computing system to implement any of the methods of Examples 1-52.

Example 66 is a road-side unit, comprising networking components configured to provide or operate a communications network, configured as an edge computing system to implement any of the methods of Examples 1-52.

Example 67 is an on-premise server, operable in a private communications network distinct from a public edge computing network, configured as an edge computing system to implement any of the methods of Examples 1-52.

Example 68 is a 3GPP 4G/LTE mobile wireless communications system, comprising networking and processing components configured as an edge computing system to implement any of the methods of Examples 1-52.

Example 69 is a 5G network mobile wireless communications system, comprising networking and processing components configured as an edge computing system to implement any of the methods of Examples 1-52.

Example 70 is an edge computing system configured as an edge mesh, provided with a microservice cluster, a microservice cluster with sidecars, or linked microservice clusters with sidecars, configured to implement any of the methods of Examples 1-52.

Example 71 is an edge computing system, comprising circuitry configured to implement services with one or more isolation environments provided among dedicated hardware, virtual machines, containers, or virtual machines on containers, the edge computing system configured to implement any of the methods of Examples 1-52.

Example 72 is an edge computing system, comprising networking and processing components to communicate with a user equipment device, client computing device, provisioning device, or management device to implement any of the methods of Examples 1-52.

Example 73 is networking hardware with network functions implemented thereupon, operable within an edge computing system, the network functions configured to implement any of the methods of Examples 1-52.

Example 74 is acceleration hardware with acceleration functions implemented thereupon, operable in an edge computing system, the acceleration functions configured to implement any of the methods of Examples 1-52.

Example 75 is storage hardware with storage capabilities implemented thereupon, operable in an edge computing system, the storage hardware configured to implement any of the methods of Examples 1-52.

Example 76 is computation hardware with compute capabilities implemented thereupon, operable in an edge computing system, the computation hardware configured to implement any of the methods of Examples 1-52.

Example 77 is an edge computing system configured to implement services with any of the methods of Examples 1-52, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 78 is an apparatus of an edge computing system comprising: one or more processors and one or more computer-readable media comprising instructions that, when executed by the one or more processors, cause the one or more processors to perform any of the methods of Examples 1-52.

Example 79 is one or more computer-readable storage media comprising instructions to cause an electronic device of an edge computing system, upon execution of the instructions by one or more processors of the electronic device, to perform any of the methods of Examples 1-52.

Example 80 is a computer program used in an edge computing system, the computer program comprising instructions, wherein execution of the program by a processing element in the edge computing system is to cause the processing element to perform any of the methods of Examples 1-52.

Example 81 is an edge computing appliance device operating as a self-contained processing system, comprising a housing, case, or shell, network communication circuitry, storage memory circuitry, and processor circuitry adapted to perform any of the methods of Examples 1-52.

Example 82 is an apparatus of an edge computing system comprising means to perform any of the methods of Examples 1-52.

Example 83 is an apparatus of an edge computing system comprising logic, modules, or circuitry to perform any of the methods of Examples 1-52.

Example 84 is an edge computing system, including respective edge processing devices and nodes to invoke or perform any of the operations of Examples 1-52, or other subject matter described herein.

Example 85 is a client endpoint node, operable to invoke or perform the operations of any of Examples 1-52, or other subject matter described herein.

Example 86 is an aggregation node, network hub node, gateway node, or core data processing node, within or coupled to an edge computing system, operable to invoke or perform the operations of any of Examples 1-52, or other subject matter described herein.

Example 87 is an access point, base station, road-side unit, street-side unit, or on-premise unit, within or coupled to an edge computing system, operable to invoke or perform the operations of any of Examples 1-52, or other subject matter described herein.

Example 88 is an edge provisioning node, service orchestration node, application orchestration node, or multi-tenant management node, within or coupled to an edge computing system, operable to invoke or perform the operations of any of Examples 1-52, or other subject matter described herein.

Example 89 is an edge node operating an edge provisioning service, application or service orchestration service, virtual machine deployment, container deployment, function deployment, and compute management, within or coupled to an edge computing system, operable to invoke or perform the operations of any of Examples 1-52, or other subject matter described herein.

Example 90 is an edge computing system including aspects of network functions, acceleration functions, acceleration hardware, storage hardware, or computation hardware resources, operable to invoke or perform the use cases discussed herein, with use of any Examples 1-52, or other subject matter described herein.

Example 91 is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of any of Examples 1-52, or other subject matter described herein.

Example 92 is an edge computing system adapted for mobile wireless communications, including configurations according to a 3GPP 4G/LTE or 5G network capabilities, operable to invoke or perform the use cases discussed herein, with use of any of Examples 1-52, or other subject matter described herein.

Example 93 is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of any of Examples 1-52, or other subject matter described herein.

Example 94 is networking hardware, acceleration hardware, storage hardware, or computation hardware, with capabilities implemented thereupon, operable in an edge computing system to invoke or perform the use cases discussed herein, with use of any of Examples 1-52, or other subject matter described herein.

Example 95 is an apparatus of an edge computing system comprising: one or more processors and one or more computer-readable media comprising instructions that, when deployed and executed by the one or more processors, cause the one or more processors to invoke or perform the use cases discussed herein, with use of any of Examples 1-52, or other subject matter described herein.

Example 96 is one or more computer-readable storage media comprising instructions to cause an electronic device of an edge computing system, upon execution of the instructions by one or more processors of the electronic device, to invoke or perform the use cases discussed herein, with use of any of Examples 1-52, or other subject matter described herein.

Example 97 is an apparatus of an edge computing system comprising means, logic, modules, or circuitry to invoke or perform the use cases discussed herein, with the use of any of Examples 1-52, or other subject matter described herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   computer readable instructions; and
   at least one processor circuit to be programmed based on the computer readable instructions to:
      partition a plurality of cores of a microprocessor into subsets of cores including a first subset of cores and a second subset of cores;
      access information that specifies a target lifespan of the microprocessor;
      determine a threshold period of time based on the target lifespan, the threshold period of time less than the target lifespan; and
      periodically switch at intervals of the threshold period of time between (i) a first state with the first subset of cores active and with the second subset of cores inactive, and (ii) a second state with the second subset of cores active and with the first subset of cores inactive.

2. The apparatus of claim 1, wherein one or more of the at least one processor circuit is to switch activation of the plurality of cores to limit an amount of time that the cores operate at a temperature above a rated temperature.

3. The apparatus of claim 1, wherein one or more of the at least one processor circuit is to orchestrate a transfer of operations performed at a first core of the first subset to a second core of the second subset, the operations to be transferred before the first core is switched to inactive and after the second core is switched to active.

4. The apparatus of claim 3, wherein one or more of the at least one processor circuit is to determine whether the second core has sufficient capacity for a workload of the first core before causing the operations of the first core to be transferred to the second core.

5. The apparatus of claim 3, wherein one or more of the at least one processor circuit is to at least one of (i) configure the first core and the second core to communicate with one another, (ii) configure the first core and the second core to receive and respond to activation signals and inactivation signals, or (iii) configure memories associated with the first core and the second core to have common addresses.

6. The apparatus of claim 3, wherein one or more of the at least one processor circuit is to:
   generate a time-series log of data collected by one or more sensors;
   compare an operational parameter of the first core with an operational parameter of the second core, the operational parameter of the first core and the operational parameter of the second core based on the data; and
   determine whether to switch the first core from active to inactive and to switch the second core from inactive to active based on the comparison.

7. The apparatus of claim 1, further including at least one sensor to monitor at least one of temperature, time, or core usage.

8. The apparatus of claim 7, wherein the at least one sensor includes at least one of a core usage sensor, a digital thermal sensor, or a timer, the digital thermal sensor to sense a junction temperature associated with at least one of the plurality of cores, the core usage sensor to measure at least one of respective workloads of respective ones of the cores or respective operating speeds of the respective ones of the cores, the timer to measure an amount of operating time of the cores.

9. The apparatus of claim 1, including a timer to track elapsed time, the timer to expire when an expected lifespan of the plurality of cores has been reached.

10. The apparatus of claim 1, wherein one or more of the at least one processor circuit is to:
    continue to periodically switch between the first state and the second state until an elapsed time of a timer corresponds to the target lifespan of the microprocessor.

11. The apparatus of claim 10, wherein one or more of the at least one processor circuit is to cause deactivation of the microprocessor after the elapsed time corresponds to the target lifespan.

12. At least one non-transitory computer readable medium comprising instructions to cause at least one processor circuit to at least:
    partition cores a microprocessor into subsets of cores including a first subset of cores and a second subset of cores;
    access information that specifies a target lifespan of the microprocessor;
    determine a threshold period of time based on the target lifespan, the threshold period of time less than the target lifespan; and
    periodically switch at intervals of the threshold period of time between (i) a first state with the first subset of cores active and with the second subset of cores inactive, and (ii) a second state with the second subset of cores active and with the first subset of cores inactive.

13. The at least one non-transitory computer readable medium of claim 12, wherein the instructions are to cause one or more of the at least one processor circuit to switch activation of the cores to limit an amount of time that the cores operate at a temperature above a rated temperature.

14. The at least one non-transitory computer readable medium of claim 12, wherein the instructions are to cause one or more of the at least one processor circuit to orchestrate a transfer of operations performed at a first core of the first subset to a second core of the second subset, the operations to be transferred before the first core is switched to inactive and after the second core is switched to active.

15. The at least one non-transitory computer readable medium of claim 14, wherein the instructions are to cause one or more of the at least one processor circuit to determine whether the second core has sufficient capacity for a workload of the first core before causing the operations of the first core to be transferred to the second core, the transfer to occur when the second core is determined to have sufficient capacity for the workload of the first core.

16. The at least one non-transitory computer readable medium of claim 14, wherein the instructions are to cause one or more of the at least one processor circuit to at least one of (i) configure the first core and the second core to communicate with one another, (ii) configure the first core and the second core to receive and respond to activation signals and inactivation signals, or (iii) configure memories associated with the first core and the second core to have common addresses.

17. The at least one non-transitory computer readable medium of claim 14, wherein the instructions are to cause one or more of the at least one processor circuit to:
generate a time-series log of data collected by a plurality of sensors;
compare an operational parameter of the first core with an operational parameter of the second core, the operational parameter of the first core and the operational parameter of the second core based on the data; and
determine whether to switch the first core from active to inactive and to switch the second core from inactive to active based on the comparison.

18. The at least one non-transitory computer readable medium of claim 12, wherein the instructions are to cause one or more of the at least one processor circuit to:
continue to periodically switch between the first state and the second state until an elapsed time of a timer corresponds to the target lifespan of the microprocessor.

19. The at least one non-transitory computer readable medium of claim 18, wherein the instructions are to cause one or more of the at least one processor circuit to cause deactivation of the microprocessor after the elapsed time corresponds to the target lifespan.

* * * * *